United States Patent [19]

Ishiguro

[11] Patent Number: 5,298,934
[45] Date of Patent: Mar. 29, 1994

[54] RANGE FINDER FOR PASSIVE TYPE AUTOFOCUSSING DEVICE

[75] Inventor: Minoru Ishiguro, Omiya, Japan

[73] Assignee: Fuji Photo Optical Co., Ltd., Saitama, Japan

[21] Appl. No.: 961,544

[22] Filed: Oct. 15, 1992

Related U.S. Application Data

[63] Continuation-in-part of Ser. No. 958,665, Oct. 8, 1992, and a continuation-in-part of Ser. No. 834,636, Feb. 12, 1992.

[30] Foreign Application Priority Data

Oct. 16, 1991 [JP] Japan ................................. 3-296458
Oct. 16, 1991 [JP] Japan ................................. 3-296459
Oct. 16, 1991 [JP] Japan ................................. 3-296460
Oct. 16, 1991 [JP] Japan ................................. 3-296461

[51] Int. Cl.$^5$ ............................................. G03B 3/00
[52] U.S. Cl. ................................... 354/402; 354/406; 354/408
[58] Field of Search ................. 354/402, 406, 407, 408

[56] References Cited

U.S. PATENT DOCUMENTS

| | | | |
|---|---|---|---|
| 4,373,791 | 2/1983 | Araki | 354/402 |
| 4,575,626 | 3/1986 | Dinoue et al. | 354/407 X |
| 4,616,264 | 10/1986 | Pshtissky | 354/407 |
| 5,070,353 | 12/1991 | Komiya et al. | 354/402 |

OTHER PUBLICATIONS

U.S. patent application Ser. No. 07/834,636, filed Feb. 12, 1992, entitled Range Finder for Passive Type Autofocussing Device.
U.S. patent application Ser. No. 07/846,166, filed Mar. 5, 1992, entitled Range Finder for Passive Type Autofocussing Device.
U.S. patent application Ser. No. 07/957,617, filed Oct. 6, 1992, entitled Extrinsic Light Eliminator for Autofocussing Circuit.
U.S. patent application Ser. No. 07/958,665, filed Oct. 8, 1992, entitled Range Finder for Passive Type Autofocussing Device.

*Primary Examiner*—Michael L. Gellner
*Assistant Examiner*—Jae N. Noh
*Attorney, Agent, or Firm*—Price, Heneveld, Cooper, DeWitt & Litton

[57] ABSTRACT

A range finder circuit for a passive-type autofocusing device includes three line photosensors. Secondary differences of their output signals and the zero-cross points of the secondary differences are detected and stored. A coincidence detecting circuit compares the stored zero-cross behavior signals and detects a coincidence of these zero-cross behavior signals. A range finding is obtained from the coincidence information. According to one embodiment of the invention a first photosensor is selected as a reference photosensor and zero-cross behavior signals obtained from the other photosensors are successfully shifted relative to the zero-cross behavior of the reference photosensor until a coincidence is detected. According to another embodiment of the invention, a pixel location of one photosensor where zero-cross data exists is provided with a predetermined width tolerance on both sides of the pixel location. A coincidence is detected when zero-cross data from the other two photosensors fall within the width tolerance of the pixel location. According to yet another embodiment of the invention, a deviation from coincidence memory circuit is coupled to the coincidence detecting circuit. The deviation from coincidence memory stores a deviation from coincidence when zero-cross data from the other two photosensors are coincident with each other. The deviation from coincidence is represented by an absolute value of the difference between the location of the coinciding zero-cross data of the other two photosensors after being shifted and the location of the reference zero-cross data which coincides with the coinciding zero-cross data of the other two-photosensors.

6 Claims, 29 Drawing Sheets

RANGE FINDER FOR PASSIVE TYPE AUTOFOCUSSING DEVICE

CROSS REFERENCE TO RELATED APPLICATIONS

This is a continuation-in-part of U.S. patent application Ser. No. 07/958665, filed Oct. 8, 1992 and entitled RANGE FINDER FOR PASSIVE-TYPE AUTOFOCUSING DEVICE and U.S. patent application Ser. No. 07/834,636, filed Feb. 12, 1992 entitled RANGE FINDER FOR PASSIVE TYPE AUTOFOCUSSING DEVICE, the disclosures of which are incorporated herein by reference.

BACKGROUND OF THE INVENTION

1. Technical Field

This invention relates to a range finder for a passive type autofocusing device so arranged that light rays emitted from a scene to be photographed are picked up to find the range to the scene and the objective is adjustably brought into focus based on a result of the range finding.

2. Prior Art

The autofocusing device is used to find a shooting range for photographic camera or the like in automatic mode and to bring the objective into focus based on a result of the range finding and such autofocusing device allows everyone to enjoy photographing easily. Various types of autofocusing device have already been developed and most of them employ the trigonometrical range finding method. A typical autofocusing device relying on this trigonometrical range finding method is a so-called passive type autofocusing device adapted to pick up light rays emitted from the scene by photosensors provided on the camera and thereby to find a shooting range.

Some of the passive type autofocusing devices include a pair of photosensors. However, if the scene includes two objects being in contrast with each other, such range finder provided with a pair of photosensors disadvantageously indicates two different states of the single scene to be photographed and consequently cannot achieve reliable range finding, necessarily resulting in a picture which is out of focus.

To assure a reliable range finding and thereby to obtain a well-focused picture, the applicant of this application has previously proposed a range finding mechanism comprising three photodetector arrays (Japanese Patent Application No. 1989-177382, Japanese Patent Application Disclosure No. 1991-42642). A principle of range finding by this range finding mechanism will be described in reference with FIGS. 30 and 31(a)–31(c) of the attached drawing. The range finding mechanism comprises a reference photosensor 1, a first photosensor 2 and a second photosensor 3. These photosensors 1, 2, 3 comprise, in turn, imaging lenses 1a, 2a, 3a and photodetector arrays 1b, 2b, 3b, respectively, so that a scene to be photographed is imaged through the imaging lenses 1a, 2a, 3a on the photodetector arrays 1b, 2b, 3b, respectively. FIG. 30 illustrates a case in which the scene P comprises a single object. Now, referring to FIG. 30, $x_0$ represents a displacement of an output signal $P_0$ relating to a luminance distribution on the object P detected by the reference photodetector array 1b with respect to an optical axis $T_0$ of the reference photosensor 1, $x_1$ represents a displacement of an output signal $P_1$ relating to a luminance distribution on the object P detected by the first photodetector array 2b with respect to an optical axis $T_1$ of the first photosensor 2, and $x_2$ represents a displacement of an output signal $P_2$ relating to a luminance distribution on the object P detected by the second photodetector array 3b with respect to an optical axis $T_2$ of the second photosensor 3. These displacements $x_0$, $x_1$, $x_2$ represent phase differences relating to the luminance distribution on the object detected by the photodetector arrays 1b, 2b, 3b, respectively. Assume that the optical axes $T_0$, $T_1$, $T_2$ are spaced from one another by B, photodetective surfaces of the photodetector arrays 1b, 2b, 3b are spaced from the respective imaging lenses 1a, 2a, 3a by distance A, and the object P lies at a distance Lp from the imaging lenses 1a, 2a, 3a and at a distance X from the optical axis $T_0$, the following equation is derived from the principle of trigonometrical survey:

$$X = x_0 \cdot Lp/A \quad (1).$$

If a direction in which the output signal image appears with respect to the optical axis $T_0$ is taken into account, $$-x_1 = (B-X)/Lp \cdot A \quad (2)$$

$$x_2 = (B+X)/Lp \cdot A \quad (3).$$

If the equation (1) is substituted for these equations (2), (3), respectively, $$x_1 = (B/Lp) \cdot A + x_0 \quad (4)$$

$$x_2 = (B/Lp) \cdot A + X_0 \quad (5).$$

Comparison of the equations (4) and (5) indicates that $x_1$ and $x_2$ are displaced with respect to a reference $x_0$, respectively, by an amount $$(B/Lp) \cdot A = Xp \quad (6).$$

Accordingly, this Xp may be obtained to compute $$Lp = A \cdot B/Xp \quad (7).$$

The procedure used to obtain the Xp will be explained in reference with FIG. 31. FIG. 31(a) illustrates output signals relating to the luminance distribution detected by the photodetector arrays 1b, 2b, 3b exposed to light rays emitted from two objects with respect to reference output signals $P_0$, $Q_0$. From the state of (a), the output signal waveforms $P_1$, $P_2$ may be shifted with respect to the output waveform $P_0$ until these output signal waveforms $P_0$, $P_1$, $P_2$ coincide with one another to obtain an amount of the displacement Xp. More specifically, at this moment of coincidence, $P_1$ and $P_2$ have been displaced by an equal amount. Accordingly, when the three output signal waveforms coincide with one another after the output signal of the photodector array 2b and the output signal of the photodetector array 3b have been shifted by an equal amount, as seen in FIG. 31(b) the waveforms of these three output signals will provide the data relating to the same object P. Next, as illustrated by (c), the output signal $Q_1$, $Q_2$ may be shifted with respect to the output signal $Q_0$ until the output signal $Q_1$, $Q_2$ coincide with the output signal $Q_0$ to obtain an amount of the displacement Xq.

Based on the Xp, Xq obtained in the manner as has been described above, the ranges Lp, Lq to the objects P, Q, respectively, are computed according to the equation (7).

SUMMARY OF THE INVENTION

However, the above-mentioned range finding procedure of prior art principally comprises steps of computing a correlation between the output signal of the reference photodetector array 1b and the output signal of the first photodetector array 2b, then computing a correlation between the output signal of the reference photodetector array 1b and the output signal of the second photodetector array 3b and finally detecting a coincidence of the output signal waveforms of the reference photodetector array 1b, the first photodetector array 2b and the second photodetector array 3b. As will be readily understood, such repeated computation of correlations necessarily prolongs the signal processing time. As a consequence, the time taken for range finding becomes inconveniently longer and a dynamic object might be photographed out of focus, resulting in a blurred picture.

Depending on a relative position of two objects included in the same scene to be photographed, these two objects may be imaged on any one of the photosensors 1, 2 and 3 in a mutually overlapping state and the range finding data obtained from the output signal generated in such a state can not be divided into two sets of data relating to the respective objects. In such a case, it will be difficult to obtain accurate range finding data.

Coincidence of the output data from the respective photosensors 1, 2, 3 is detected, as illustrated by FIG. 32, by applying these output signals to the AND gate 4. However, an installation error of the imaging lenses 1a, 2a, 3a FIG. 30 and/or the photodetector arrays 1b, 2b, 3b or a specular change possibly occurring even if such installation error has been corrected at the initial installation may cause an error in the locations at which the scene is imaged on the respective photodetector arrays 1b, 2b, 3b. Consequently, a coincidence could not be detected and therefore a range to the scene could not be computed although there really exist the data which should be detected to be coincident with one another.

When there are plural zero-cross data, it will be impossible to determine which zero-cross data are coincident with one another with respect to a common scene to be photographed.

Accordingly, it is a primary object of the invention to provide a range finder comprising three photosensors and allowing a range to the scene to be computed as precisely as possible and allowing a picture as sharp as possible to be obtained even when there is an error involved in quantization of the photosensors.

It is another object of the invention to provide a range finder allowing substantially accurate range to the scene to be computed even when the installation error or specular change of the photosensors results an error in the range finding data.

It is further another object of the invention to provide a range finder so improved to provide a highly reliable range finding data and a picture as sharp as possible even when there are plural zero-cross data.

To achieve the objects set forth above, this invention resides in a range finder for a passive type autofocusing device. The range finder including: three photosensors to pick up a luminance distribution on a scene to be photographed. Secondary difference computing circuits compute secondary differences of output signals from the respective photosensors. Zero-cross detecting circuits detect zero-cross points of output signals from the respective secondary difference computing circuits. Zero-cross memory circuits in which the zero-cross behavior signals obtained by the respective zero-cross detecting circuits are stored, and a coincidence detecting circuit to compare the zero-cross behavior signals stored in the respective zero-cross memory circuits with one another and thereby to detect a coincidence of these zero-cross behavior signals, wherein one of those three photosensors is selected as the reference photosensor and the zero-cross behavior signals obtained from the other two photosensors are successively shifted with respect to the zero-cross behavior signal obtained from the reference photosensor until a coincidence of these zero-cross behavior signals is detected by the coincidence detecting circuit a range to the scene is computed based on an amount of such shifting.

According to another aspect, the invention resides in a range finder for a passive type autofocussing device. The range finder includes three photosensors to pick up a luminance distribution on a scene to be photographed. Secondary difference computing circuits compute secondary differences of output signals from the respective photosensors. Zero cross detecting circuits detect zero-cross points of output signals from the respective secondary difference computing circuits. Zero-cross memory circuits store zero-cross behavior signals obtained by the respective zero-cross detecting circuits. A coincidence detecting circuit compares the zero-cross behavior signals stored in the respective zero-cross memory circuits with one another and thereby detects a coincidence of these zero-cross behavior signals, in. One of those three photosensors is selected as the reference photosensor and the zero-cross behavior signals obtained from the other two photosensors are successively shifted with respect to the zero-cross behavior signal obtained from the reference photosensor until a coincidence of these zero-cross behavior signals is detected by the coincidence detecting circuit. A pixel location, of at least one photosensor, at which the zero-cross data obtained from this photosensor exists is provided with a given width tolerance on both sides of the pixel location so that a coincidence can be effectively detected. The zero-cross data from the other two photosensors is coincident with the above-mentioned zero-cross pixel location when they fall within the width tolerance. A range to the scene to be photographed is computed based on an amount of the above-mentioned shifting.

According to still another aspect, the invention resides in a range finder for a passive type autofocusing device. The range finder includes three photosensors to pick up a luminance distribution on a scene to be photographed. Secondary difference computing circuits compute secondary differences of output signals from the respective photosensors. Zero-cross detecting circuits detect zero-cross points of output signals from the respective secondary difference computing circuits. Zero cross memory circuits in which the zero-cross behavior signals obtained by the respective zero-cross detecting circuits. A coincidence detecting circuit compares the zero-cross behavior signals stored in the respective zero-cross memory circuits with one another and thereby detects a coincidence of these zero-cross behavior signals. A deviation-from-coincidence memory circuit is used to parallel with the coincidence detecting circuit in detect a coincidence of the zero-cross behavior signals. One of the three photosensors is selected as a reference photosensor and the zero-cross behavior signal obtained from the other two photosensors are successively shifted with respect to the zero-cross behavior signal obtained from the reference photosensor until a coincidence of these zero-cross behavior signals is detected by the coincidence detecting circuit. When those two zero-cross data being compared are coincident with each other and the zero-cross data obtained from the reference photosensor contains the reference zero-cross data which coincides with the zero-cross data being compared, a deviation-from-coincidence is stored represented by the absolute of a difference between the location of the zero-cross data being compared after shifted and the location of the reference zero-cross data in one to one relationship, with the result of range finding obtained by the coincidence detecting circuit. A range to the scene is computed based on the result of range finding obtained with the minimum deviation-from-coincidence between the mutually coincident two zero-cross data being compared and the reference zero-cross data.

In one preferred embodiment, the zero-cross data contained in a width tolerance provided on both sides of the reference zero-cross data is also scanned, based on the minimum deviation-from-coincidence between the mutually coincident two zero-cross data being compared and the reference zero-cross data, by scanning the zero-cross data associated with the reference photosensor.

With such arrangement, photodetector arrays constituting the respective photosensors provide output voltage signals representing the luminance distribution on the scene and secondary difference distributions of the respective output voltage signals behave across the respective zero levels. For the luminance distribution on the same portion of the scene, the zero-cross points of such behaviors associated with three photosensors will be coincident with one another but shifted relative to a given reference portion. Of these zero-cross points, only that appearing when the primary differences derived from computation of the associated secondary differences have absolute values larger than a predetermined value will be detected as a true zero-cross point.

An amount of this shift corresponds to an amount by which the coincidence detecting circuit has shifted the zero-cross behavior signal waveforms until a coincidence thereof is detected.

Based on this amount of shift, a range to the scene can be computed according to the principle of trigonometrical survey.

The signal waveforms associated with those two photosensors may be alternately shifted with respect to the signal waveform associated with the reference photosensor to pick up the luminance information concerning the image of the scene to be photographed and thereby to compute a range to the scene even if, due to an error involved in spatial quantization, the scene is erroneously imaged on a pixel adjacent the pixel on which the scene should be imaged.

When the extent over which the zero-cross data are normally compared with one another for detection of coincidence is provided with a width tolerance, it is possible to obtain the data indicating a coincidence of the output signals from those three photosensors and thereby to compute a range to the scene to be photographed even if there is an error involved in installation of the photosensors.

By providing an arrangement such that, when the zero-cross data associated with two of those three photosensors are coincident with each other but deviate from a coincidence with the zero-cross data associated with the remaining photosensor, an effective range finding data can be obtained at the minimum deviation-from-coincidence, a range to the scene to be photographed can be computed based on this range finding data even in the case that the zero-cross data associated with those two photosensors are not coincident with the reference zero-cross data due to an error involved installation of the photosensors.

Additionally, an extent of the zero-cross data associated with the reference photosensor to be scanned for detection of a deviation-from-coincidence may be limited to the reference zero-cross data plus a given width tolerance provided on both sides of the reference zero-cross data to reduce a time required for detection of the deviation-from-coincidence.

DETAILED DESCRIPTION OF THE INVENTION

Figure 11:
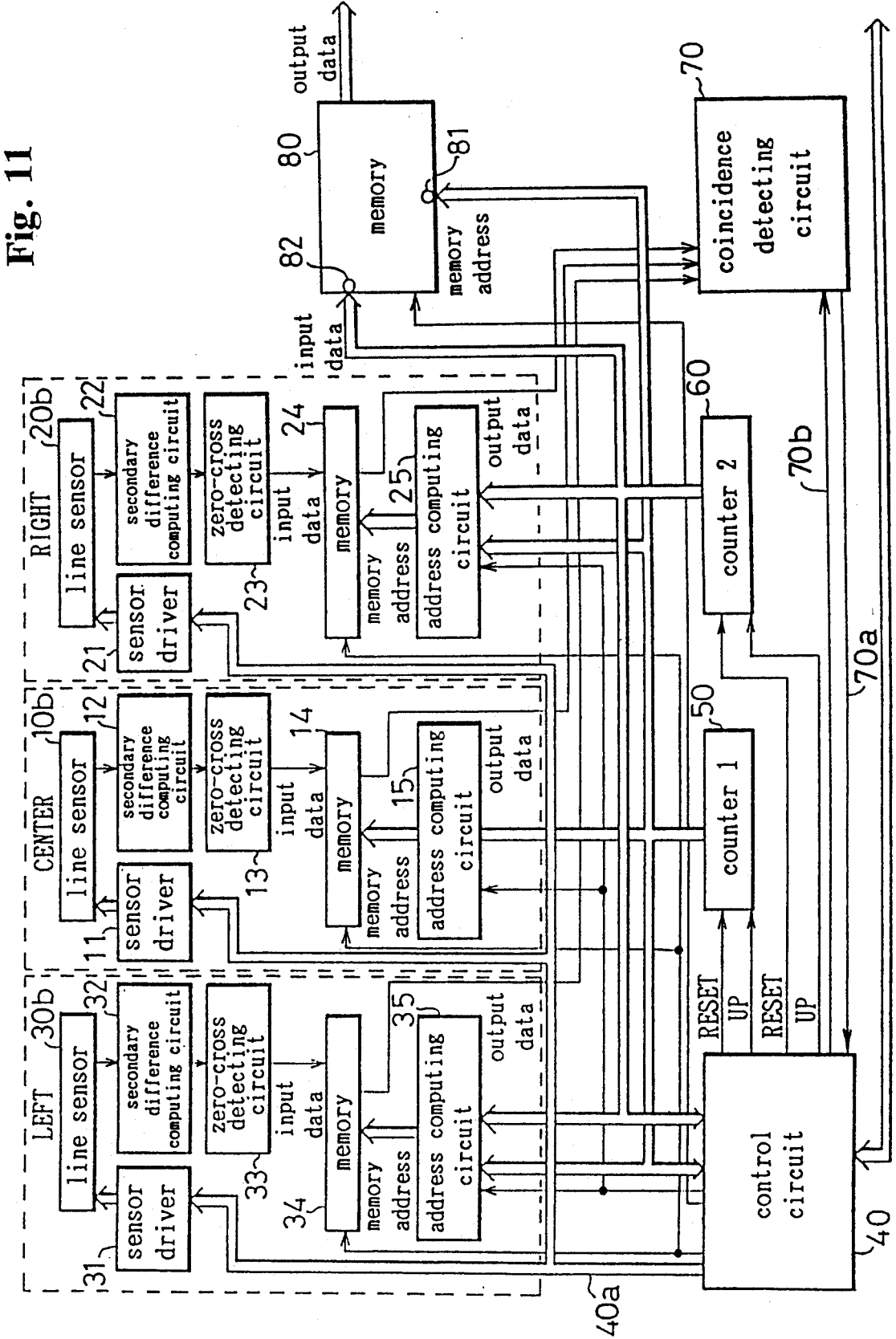
FIG. 11 is a circuit block diagram showing Embodiment 2.1 of the range finder for a passive type autofocussing device constructed in accordance with the invention.
Figure 12:
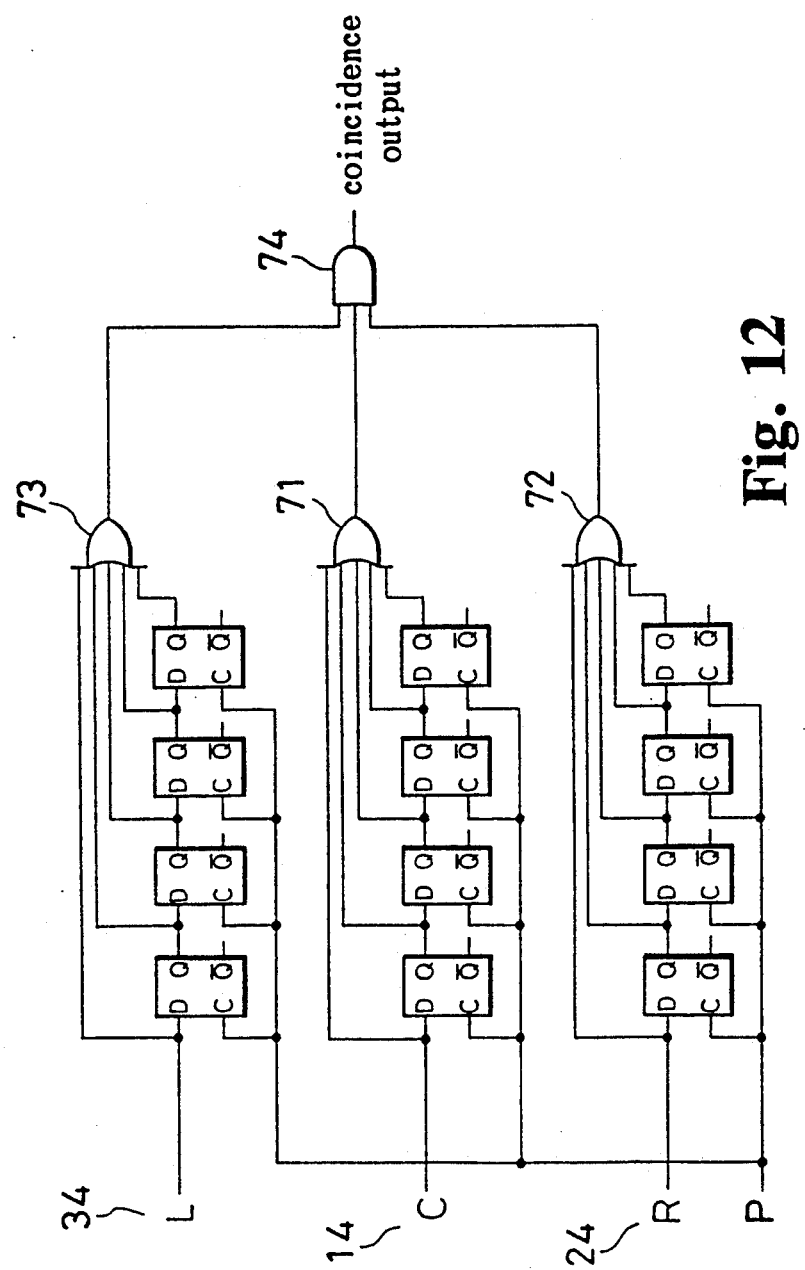
FIG. 12 is a schematic circuit diagram showing an arrangement of the coincidence detecting circuit used in Embodiments 2.1 and 2.2.
Figure 13:
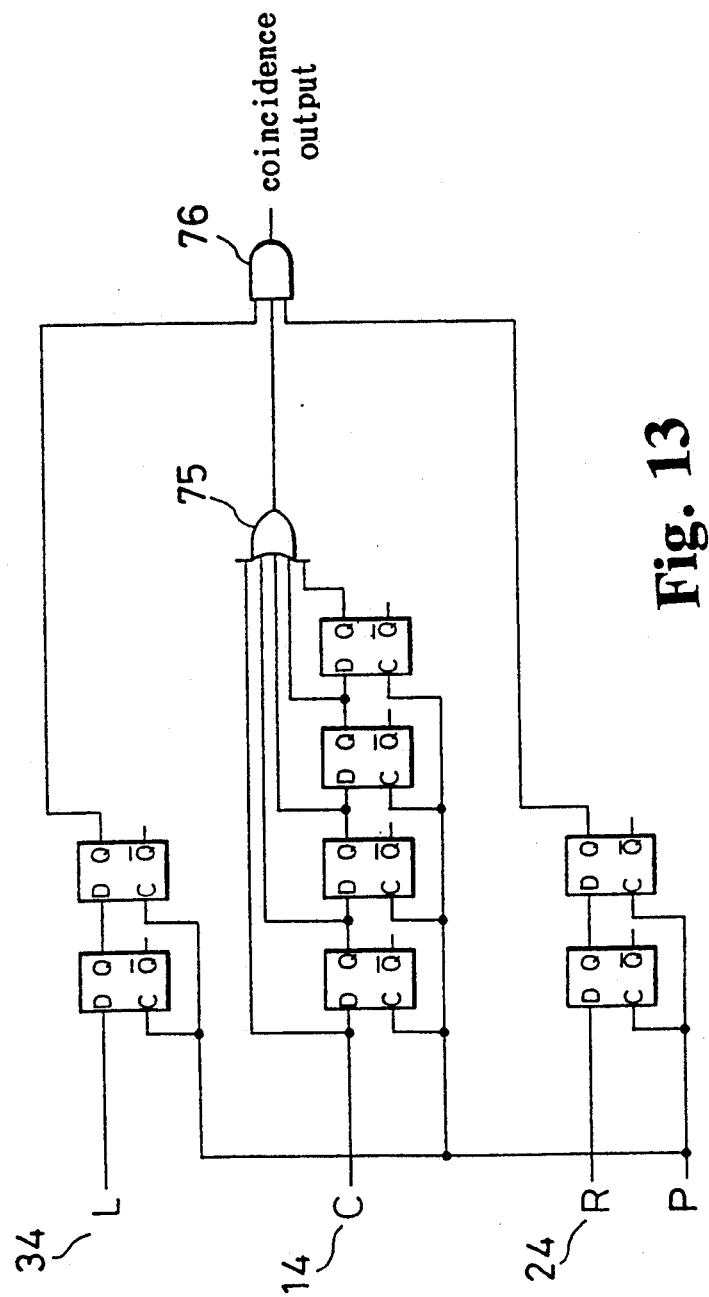
FIG. 13 is a schematic circuit diagram showing an alternative arrangement of the coincidence detecting circuit used in Embodiments 2.1 and 2.2.
Figure 24A:
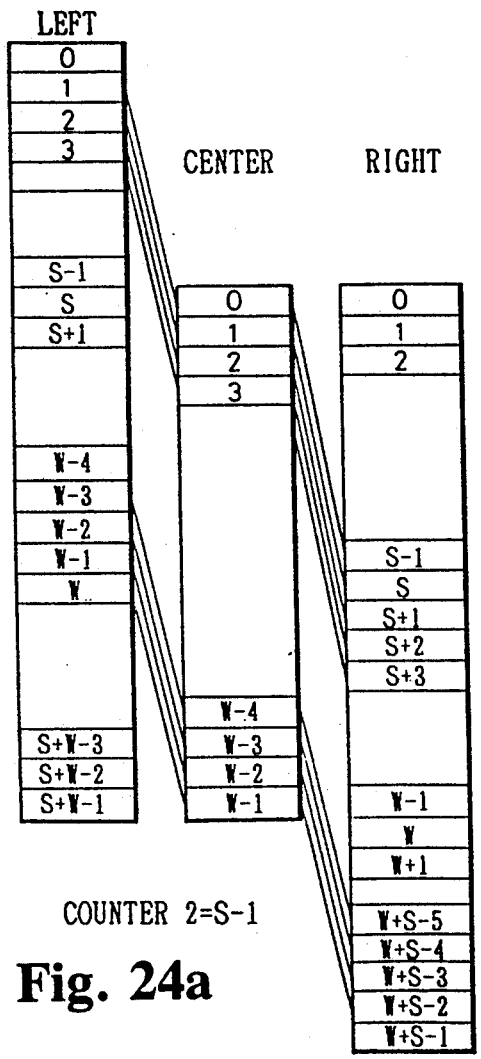
FIG. 24(a) and FIG. 24(b) is a diagram illustrating the procedure executed in Embodiments 3.1, 3.2, 4.1 and 4.2 to read and compare the data stored in the respective zero-cross memory circuits.
Figure 24B:
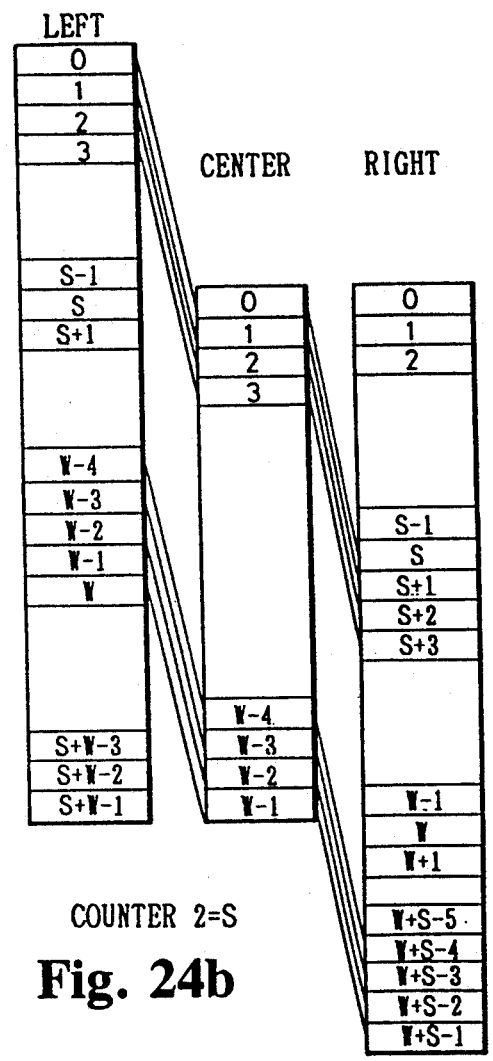
Figure 25:
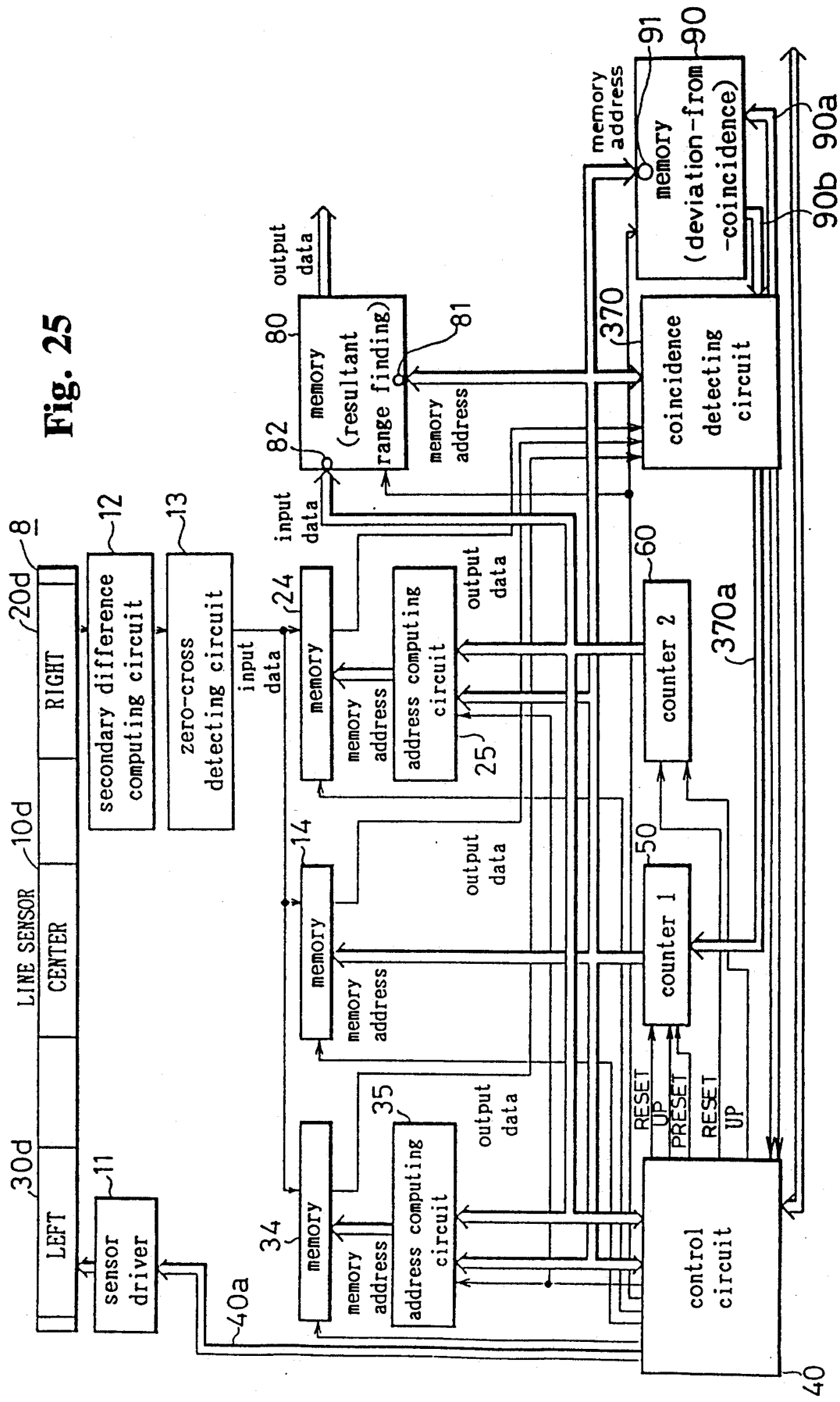
FIG. 25 is a circuit block diagram showing Embodiment 3.2 of the range finder for a passive type autofocusing device constructed in accordance with the invention.
Figure 26:
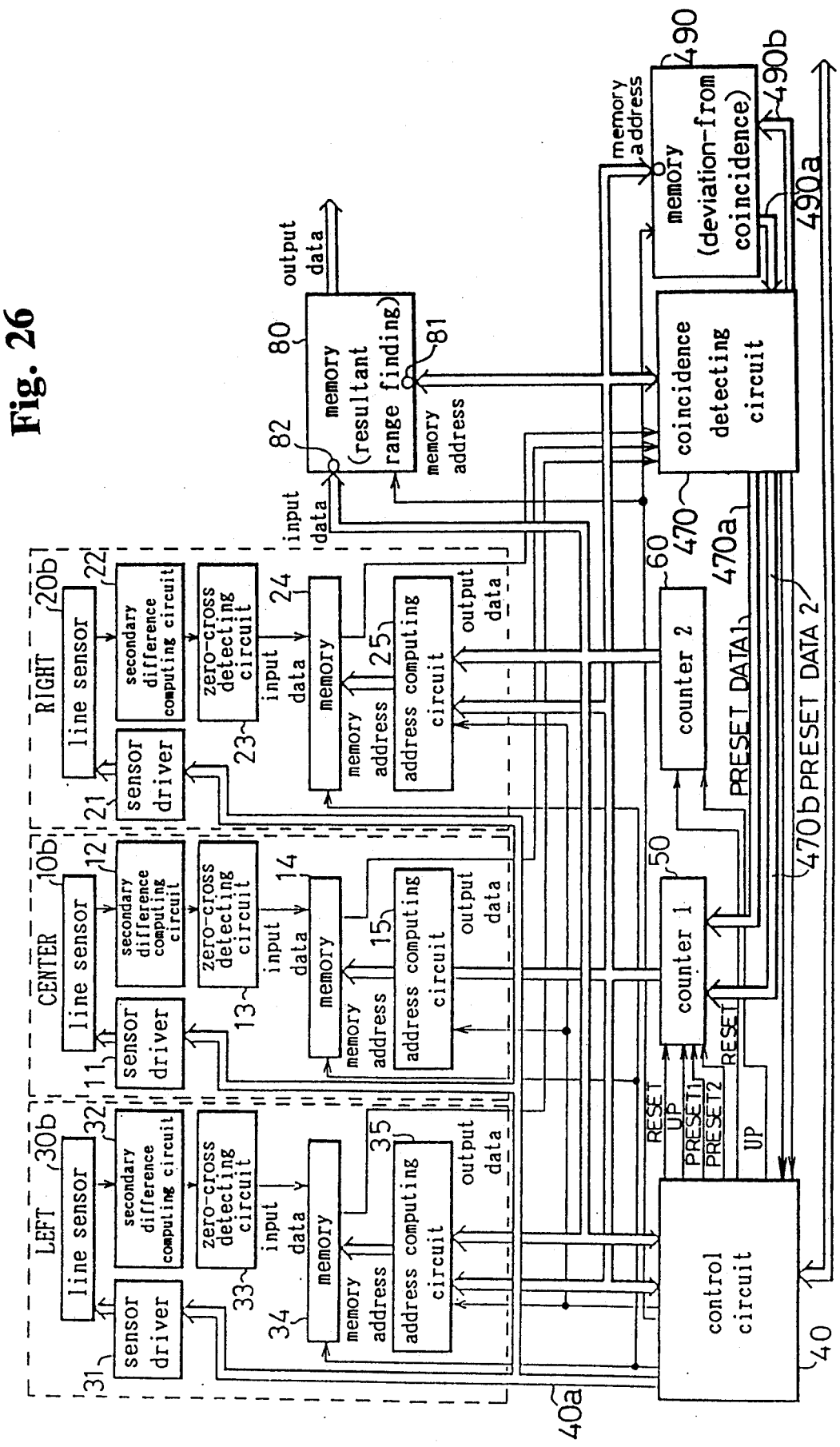
FIG. 26 is a circuit block diagram showing Embodiment 4.1 of the range finder for a passive type autofocusing device constructed in accordance with the invention.
Figure 27:
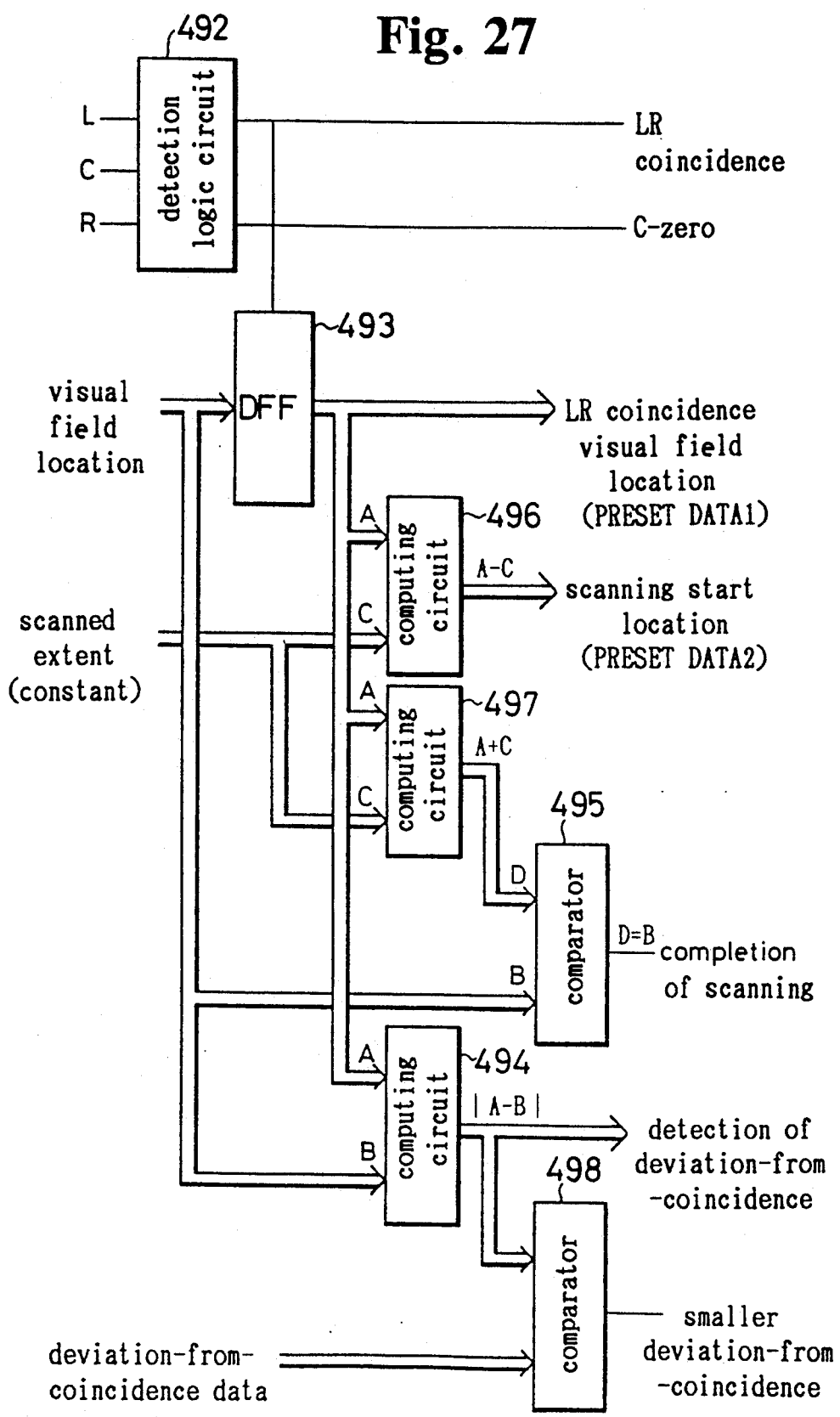
FIG. 27 is a block diagram showing a circuit used in Embodiments 4.1 and 4.2 to detect a deviation-from-coincidence in the zero-cross data.
Figure 28:
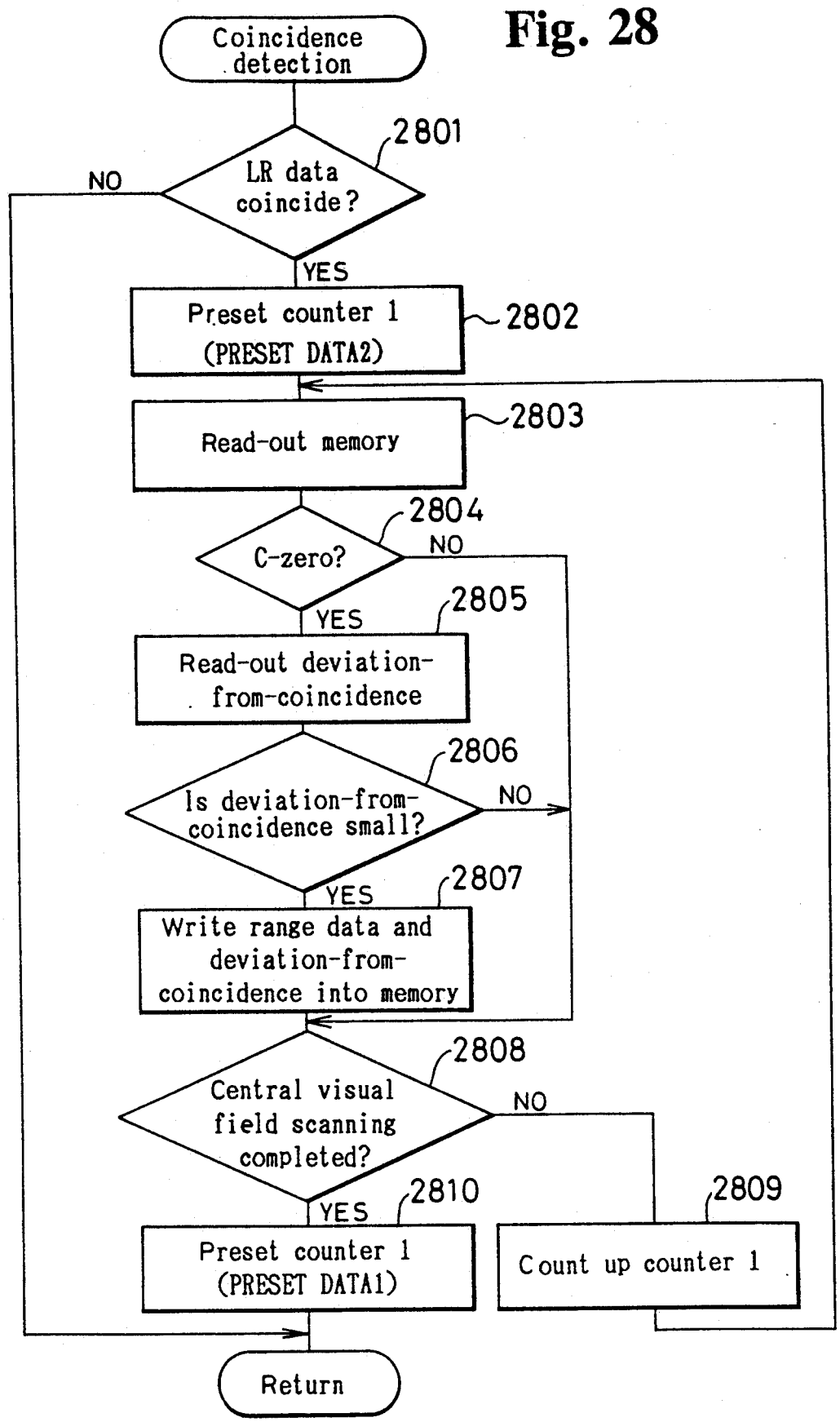
FIG. 28 is a flow chart of the program routine executed in Embodiments 4.1 and 4.2 to obtain the range finding data based on information indicating a coincidence or the minimum deviation-from-coincidence in the data stored in the respective zero-cross memory circuits.
Figure 29:
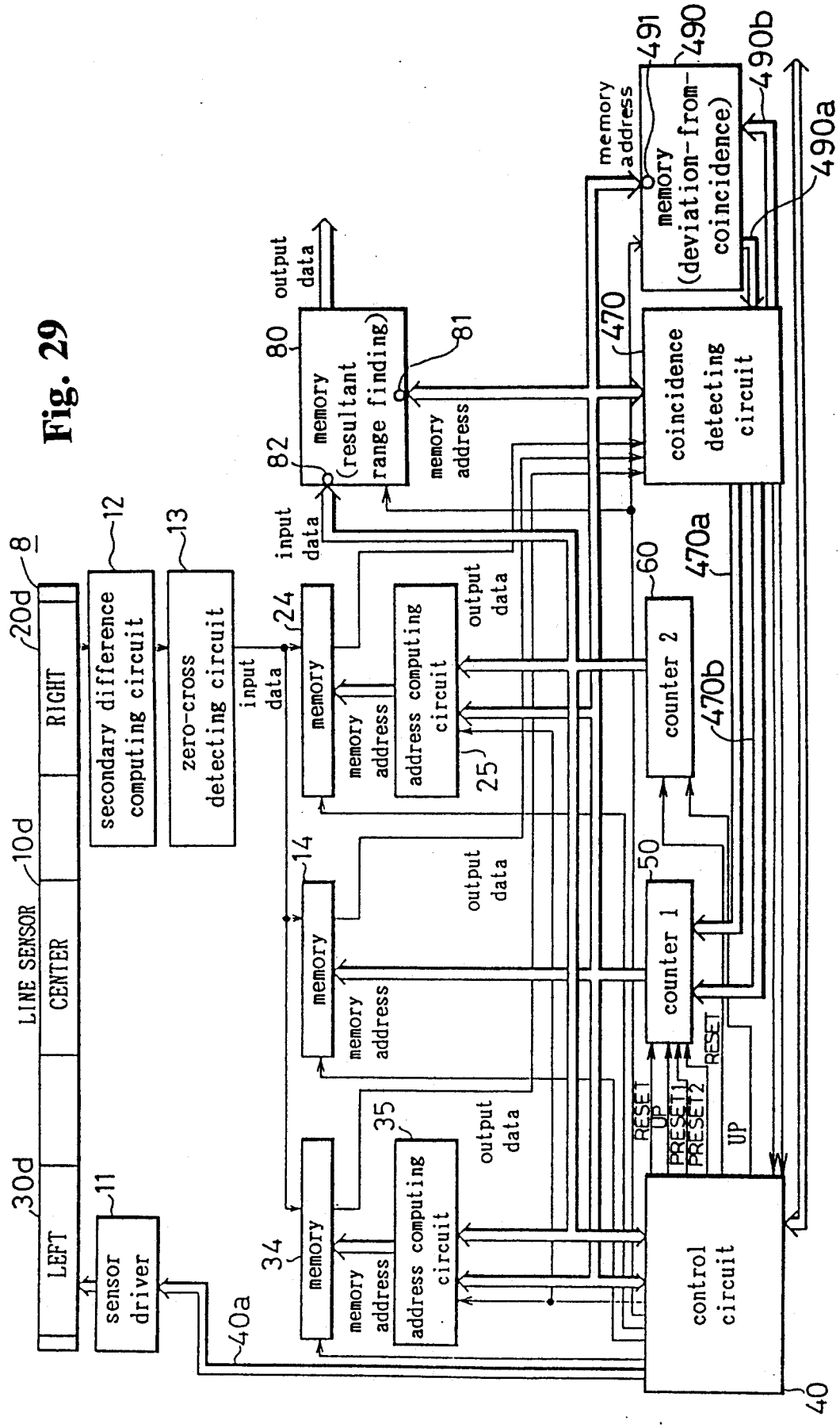
FIG. 29 is a circuit block diagram showing Embodiment 4.2 of the range finder for a passive type autofocusing device constructed in accordance with the invention.
Figure 30:
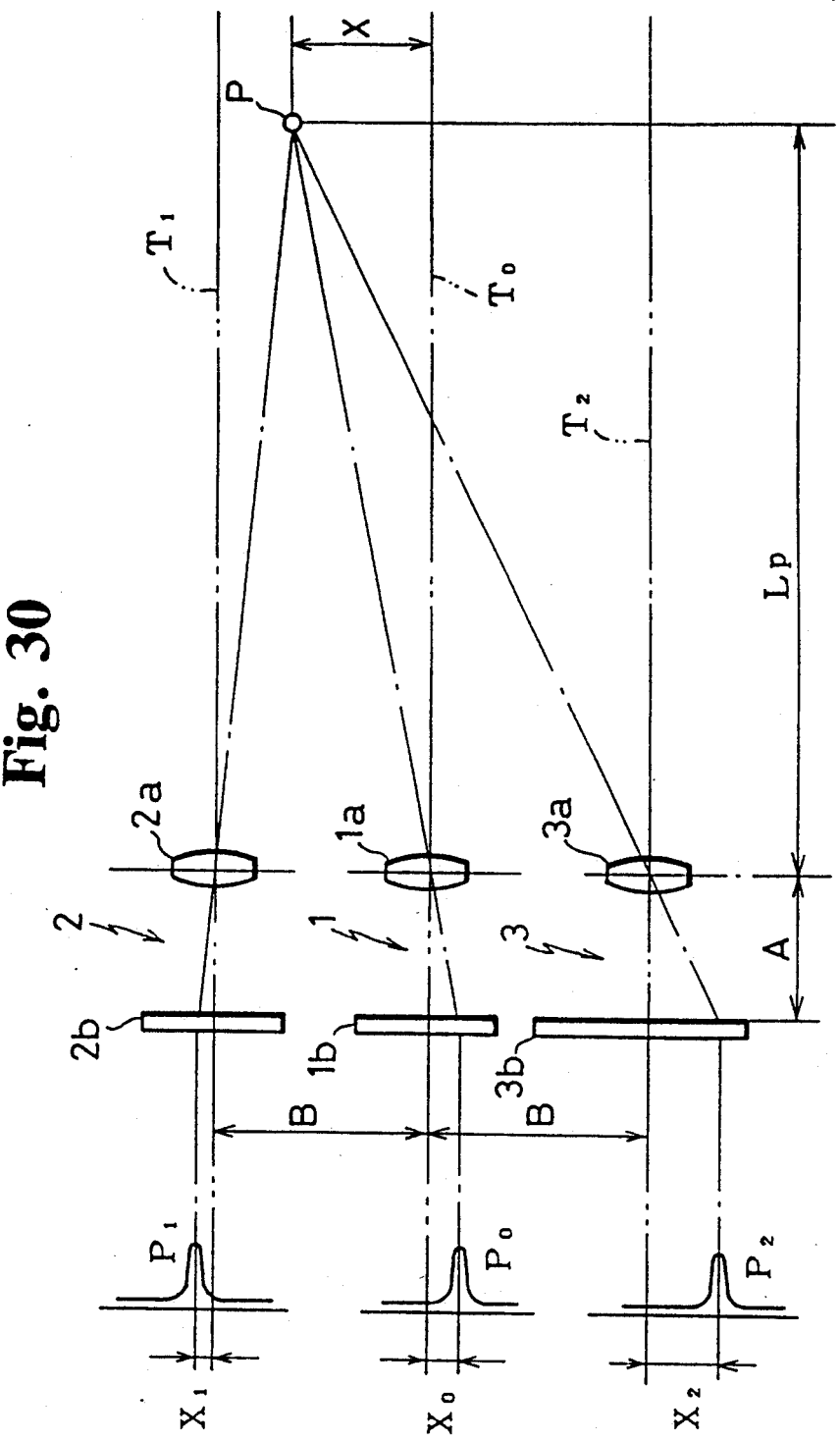
FIG. 30 is an optical path diagram illustrating a principle of range finding.

The range finder for autofocusing device of the invention will be described more specifically in reference to the attached drawings, in which FIGS. 1 through 10 illustrate Embodiment 1. FIGS. 11 through 13 illustrate Embodiment 2.1. FIGS. 14 through 18 illustrate Embodiment 2.2. Embodiment 2.1 is characterized by one arrangement of the coincidence detecting circuit while Embodiment 2.2 is characterized by another arrangement of the coincidence detecting circuit. FIGS. 19 through 24 illustrate Embodiment 3.1. FIG. 25 illustrates Embodiment 3.2. Embodiments 3.1 and 3.2 include specific arrangements adapted to detect a coincidence of zero-cross points. FIGS. 26 through 28 illustrate Embodiment 4.1. FIG. 29 illustrates Embodiment 4.2. Both Embodiments 4.1 and 4.2 also include specific arrangements adapted to detect a coincidence of zero-cross points.

EMBODIMENT 1

Photosensors 10, 20, 30 (FIGS. 1 and 2) comprise line sensors which comprise, in turn, photodetector arrays each including an appropriate number of pixels arranged side by side, and imaging lenses combined with the line sensors. Referring to FIG. 2, there are provided on the front side of the photographic camera three imaging lenses 10a, 20a, 30a so that light rays emitted from a scene to be photographed pass through these imaging lenses 10a, 20a, 30a and the scene is imaged on respective line sensors 10b, 20b, 30b placed behind the associated imaging lenses. These photosensors 10, 20, 30 are referred to hereinafter as the central sensor 10, the right side sensor 20 and the left side sensor 30 with optical axes 20c, 30c of the right side sensor 20 and the left side sensor 30, respectively, being arranged symmetrically with respect to an optical axis 10c of the central sensor 10. The line sensors 10b, 20b, 30b are referred to hereinafter as the central line sensor 10b, the right side line sensor 20b and the left side line sensor 30b.

Figure 1:
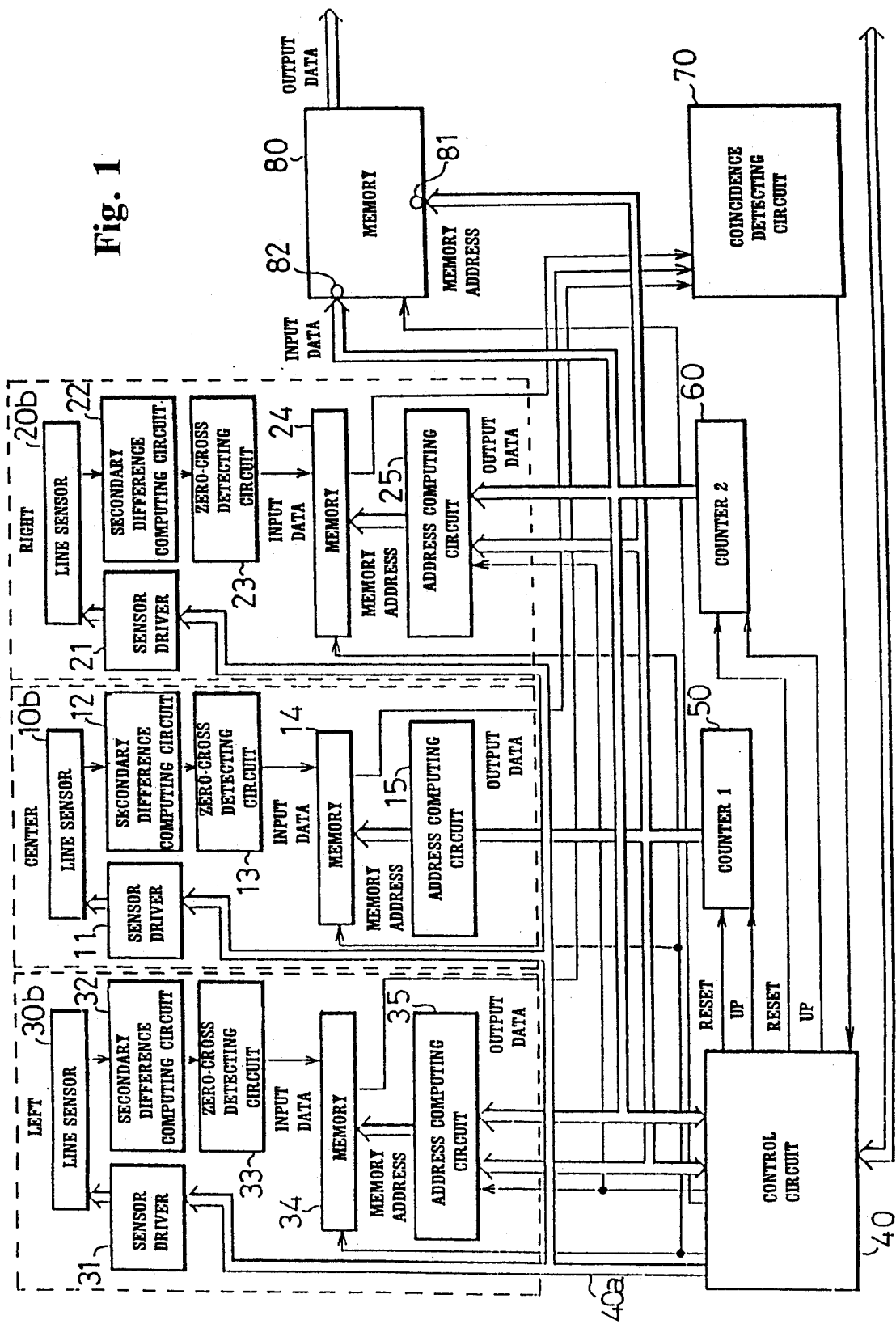
FIG. 1 is a circuit block diagram showing Embodiment 1 of the range finder for a passive type autofocusing device constructed in accordance with the invention.
Figure 2:
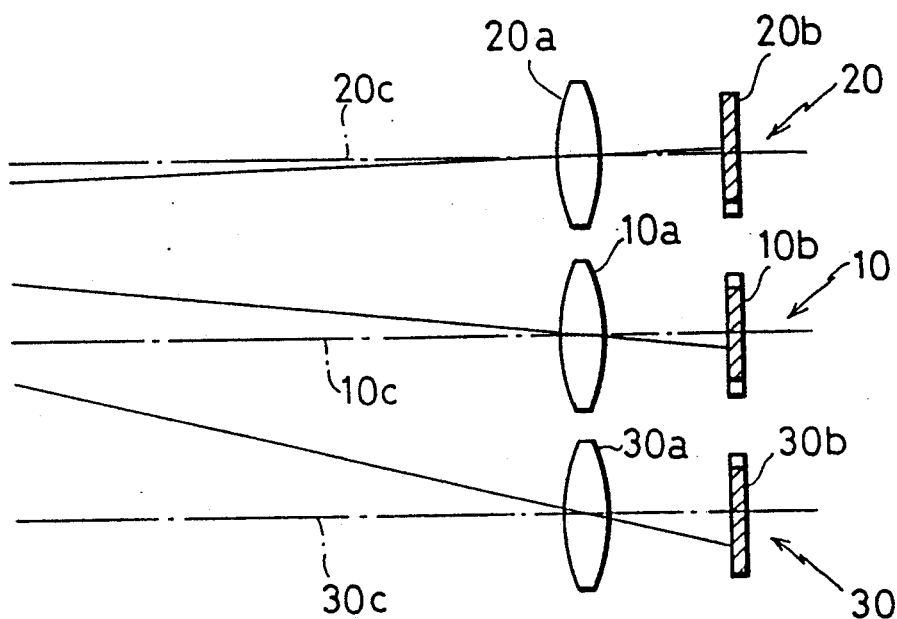
FIG. 2 is a side view schematically showing the photosensors in Embodiments 1, 2.1, 3.1 and 4.1.

The line sensors 10b, 20b, 30b are separately applied, as illustrated in FIG. 1, with drive signals from respective sensor drivers 11, 21, 31 and begin to pick up the light rays coming from the scene on the basis of the drive signals. The sensor drivers 11, 21, 31 are connected to a control circuit 40 via a drive control signal link 40a and controlled by a drive control signal provided from the control circuit 40.

Figure 3:
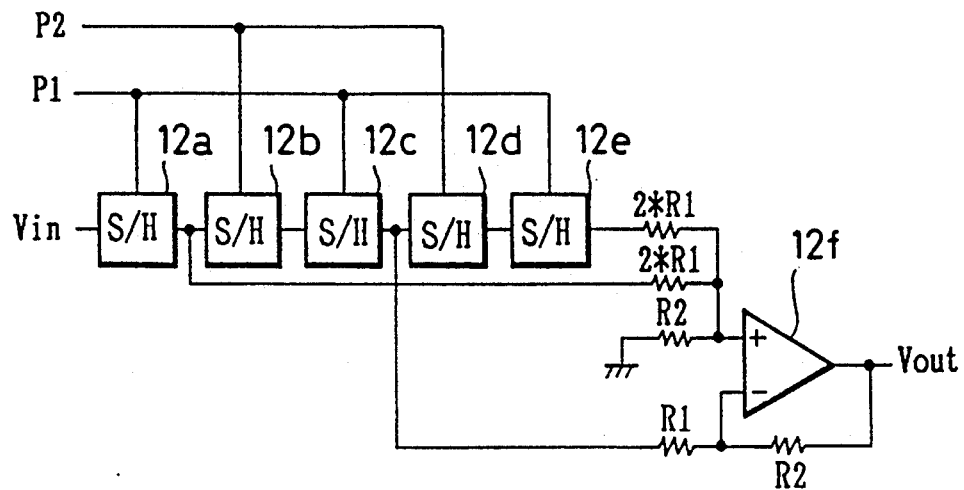
FIG. 3 is a schematic circuit diagram showing the secondary differences computing circuit adapted to compute secondary differences from the outputs of the associated line sensors.
Figure 4:
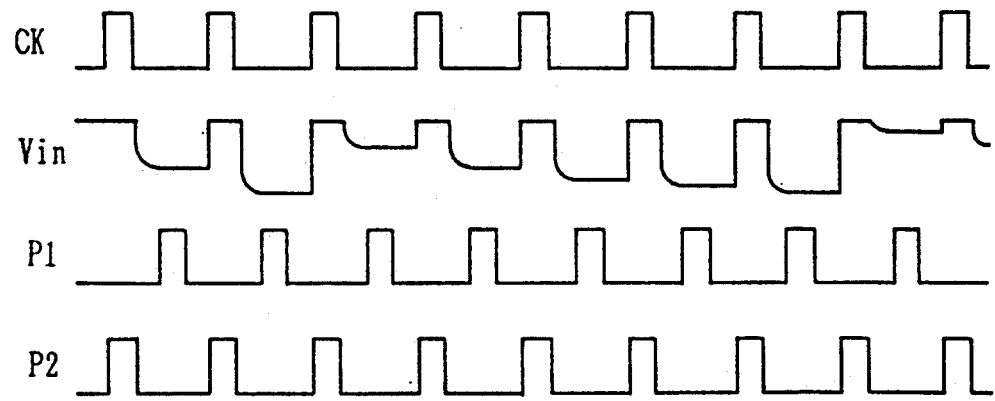
FIG. 4 is a voltage waveform time chart for the circuit of FIG. 3.
Figure 7A:
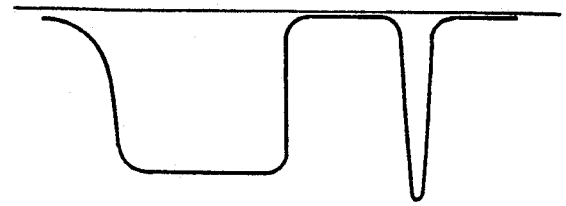
FIG. 7 (a), is a FIG. 7(b), FIG. 7(c) diagram showing the waveform luminance distribution on the scene to be photographed and primary and secondary difference signal waveforms reflecting this luminance distribution.
Figure 7B:
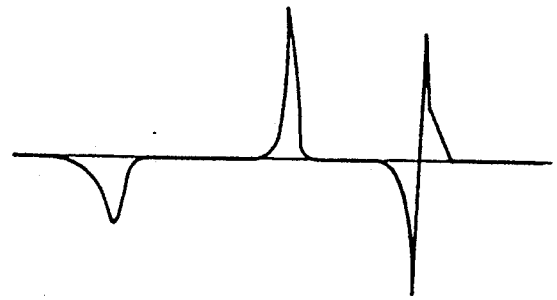
Figure 7C:
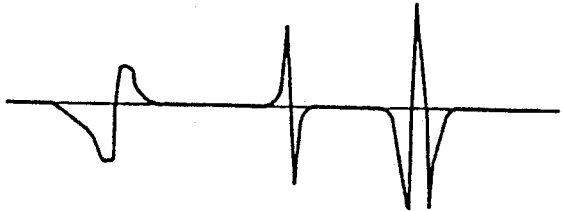

As will be apparent from FIG. 1, secondary difference computing circuits 12, 22, 32 are connected to output terminals of the line sensors 10b, 20b, 30b, respectively, and the secondary difference computing circuits 12, 22, 32 compute secondary differences of the luminance distribution signals on the scene which have been obtained by the respective line sensors 10b, 20b, 30b. Referring to FIG. 3, these secondary difference computing circuits 12, 22, 32 utilize sample-and-hold circuits 12a, 12b, 12c, 12d, 12e to shift and sample successively output signals Vin from the respective pixels of the line sensors 10b, 20b, 30b, and utilize an operational amplifier 12f and resistance of an appropriate value to compute $$V_{out}=(R2/(2*R1))*(V_{in}(n-2)-2*V_{in}(n-1)+V_{in}(n)) \quad (8)$$

and thereby to determine the secondary difference. FIG. 4 is a time chart for these secondary difference computing circuits 12, 22, 32 and FIG. 7(a) is a waveform diagram showing a scene luminance distribution waveform, FIG. 7(b) the corresponding primary difference waveform and FIG. 7(c) is a waveform shows the corresponding secondary difference waveform.

Figure 5:
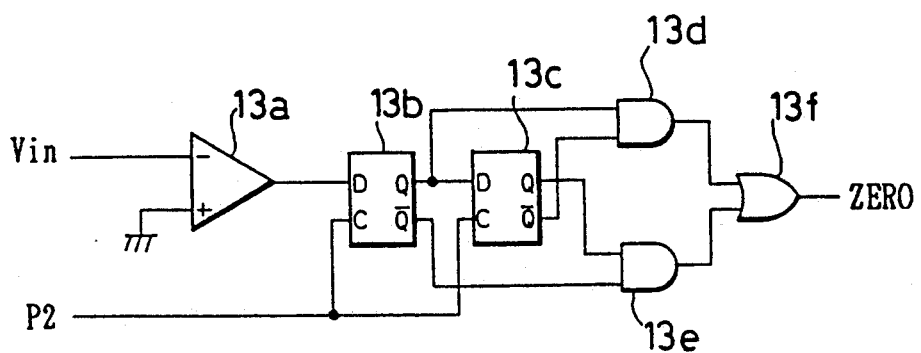
FIG. 5 is a schematic circuit diagram showing the zero-cross detecting circuit adapted to detect the zero-cross point of the secondary difference signal provided from the associated secondary difference computing circuit.
Figure 6:
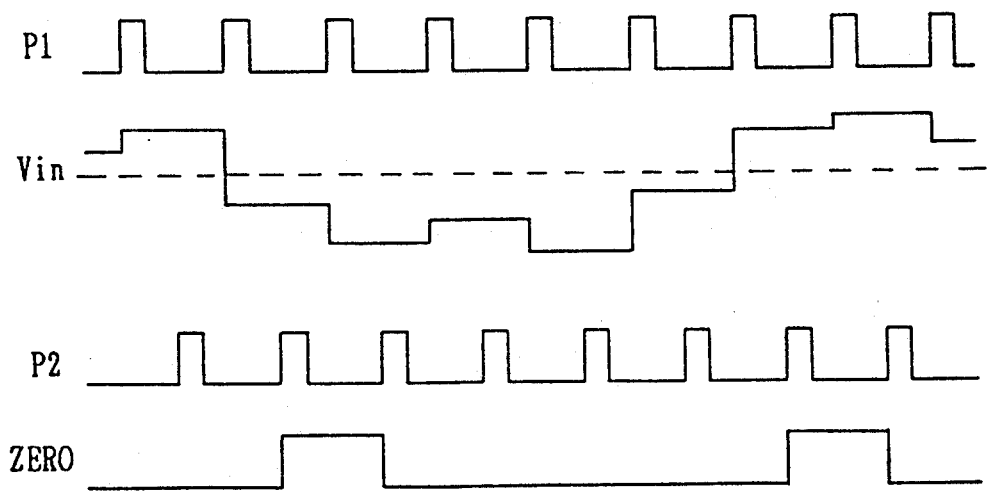
FIG. 6 is a voltage waveform time chart for the circuit of FIG. 5.

As illustrated in FIG. 1, output signals of the secondary difference computing circuits 12, 22, 32 are applied to zero-cross detecting circuits 13, 23, 33, respectively, which detect the zero-cross points of the respective secondary differences obtained by the secondary difference computing circuits 12, 22, 32. Referring to FIG. 5, output signal Vin from the secondary difference computing circuit 12 (22, 32) is applied to an input terminal of a comparator 13a as a component of the zero-cross detecting circuit 13 (23, 33) and a reference terminal of this comparator 13a is grounded. Flip-flop 13b is connected to the output side of the comparator 13a the Q output of flip-flop 13b is applied to the D input of flip-flop 13c. The Q output of the flip-flop 13b and the $\overline{Q}$ output of the flip-flop 13c are applied to an AND gate 13d while the Q output of the flip-flop 13c and $\overline{Q}$ output of the flip-flop 13b are applied together to an AND gate 13e so that output signals of these AND gates 13d, 13e are applied together to an OR gate 13f. As will be understood from the time chart of FIG. 6, the output signal Vin of the secondary difference computing circuit 12 is applied to the comparator 13a synchronously with a clock pulse P1 and, when the output signal Vin crosses the zero level and has its sign changed, the zero-cross signal is generated in the form of ZERO pulse synchronously with a clock pulse P2 provided from the flip-flops 13b, 13c.

Zero-cross behavior signal waveforms obtained by the zero-cross detecting circuits 13, 23, 33 are applied to zero-cross memory circuits 14, 24, 34 and stored therein, respectively. These zero-cross behaviors are then stored at addresses which are output from respective address computing circuits 15, 25, 35 according to the pixel locations in the respective line sensors 10b, 20b, 30b. More specifically, counter signals (COUNTER 1) are applied from a first counter 50 to the address computing circuits 15, 25, 35 with successive increments and the zero-cross behavior signal waveforms are stored at the respective addresses corresponding to the respective pixels given in accordance with the following equations:

$$ADDRESS = COUNTER\ 1 - S \quad (9)$$

for the central memory circuit 14, $$ADDRESS = COUNTER\ 1 - S \quad (10)$$

for the right side memory circuit 24, and $$ADDRESS = COUNTER\ 1 \quad (11)$$

for the left side memory circuit 34. In the equations (9) and (10), S represents a constant.

Count signals (COUNTER 2) from a second counter 60 are applied to the address computing circuits 25, 35. Count up and reset of the second counter 60 and the first counter 50 are performed under control of an output signal from the control circuit 40. The second counter 60 increments the address for every read-out of data from the zero-cross memory circuits 24, 34, as will be described later. The address computing circuits 15, 25, 35 are also supplied from the control circuit 40 with address processing information on the basis of which the address computing circuits 15, 25, 35 output predetermined write/read signals into and from the zero-cross memory circuits 14, 24, 34.

Output sides of the zero-cross memory circuit 14, 24, 34 are connected to a coincidence detecting circuit 70 of which the output side is, in turn, connected to the control circuit 40.

The count signal from the first counter 50 is applied to an address port 81 of a data memory circuit 80 while the count signal from the second counter 60 is applied to a range data port 82 of the data memory circuit 80. Both the count signal from the first counter 50 and the count signal from the second counter 60 are also applied to the control circuit 40. The control circuit 40 supplies the data memory circuit 80 with a data memory signal on the basis of which the address data and the range data are stored in the data memory circuit 80.

Now referring to FIGS. 8 and 9, a routine to write and read the luminance information memory for a scene to be photographed will be described.

Upon start of range finding, charge accumulation occurs on the respective line sensors 10b, 20b, 30b (step 801), then the second counter 60 is reset (step 802) and the first counter 50 also is reset (step 803). Data corresponding to a single pixel in each line sensor 10b, 20b, 30b is read out (step 804), the data thus read out are written into the respective zero-cross memory circuits 14, 24, 34 (step 805). It should be understood here that zero-cross detection is executed between the step 804 and the step 805. Next, the routine proceeds to a step 806 to determine whether read-out concerning all the pixels has been completed or not, based on a value of the first counter 50. If not, the routine now proceeds to a step 807 to count up the first counter 50 and then returns to the step 804 to read respective single pixels, followed by writing them into the zero-cross memory circuits 14, 24, 34 (step 805). The data written into the zero-cross memory circuits 14, 24, 34 are stored at the addresses assigned by the address computing circuits 15, 25, 35, based on the count signals from the first counter 50. The addresses at which the data are to be stored are assigned according to the above-mentioned equations (9), (10) and (11). It should be noted that, when the addresses are negative, no write-in occurs.

If read-out of the data corresponding to all the pixels has been completed and conclusion of the step 806 is YES, the routine then proceeds to a step 901 (FIG. 9) to reset the first counter 50. Next, data are read out from the zero-cross memory circuits 14, 24, 34 (step 902) and the coincidence detecting circuit 70 determines whether the data from the central zero-cross memory circuit 14, the right side zero-cross memory circuit 24 and the left side zero-cross memory circuit 34 coincide with one another or not (step 903). If the coincidence is detected, the routine proceeds to a step 904 to write a current value of the first counter's count signal (COUNTER 1) as address data and a current value of the second counter's count (COUNTER 2) as range data into the data memory circuit 80. If determination of the step 903 is NO, the routine proceeds to a step 905 to determine whether the memory data (reference data) corresponding to all the effective pixels in the central line sensor 10b have been completely read out or not, based on the count value of the first counter 50. If not, the routine proceeds to a step 906 to count up the first counter 50 and thereafter returns to the step 902 to repeat the steps 902 through 905.

After read-out of the reference data has been completed, the routine proceeds from the step 905 to a step 907 to determine whether the data in the right and left side zero-cross memory circuits 24, 34 have been shifted by a specified amount and the above-mentioned steps 901 through 905 have been executed (shift read-out) or not, based on the count value of the second counter 60 (step 907). If the shift read-out has not been completed, the second counter 60 is counted up and thereafter the routine returns to the step 901. Then, the steps 902 through 905 are repeated. After the shift read-out has been completed, the routine proceeds to a step 909.

Read-out of the memory data during these steps 901 through 908 is performed according to the following equations in which COUNTER $2_2$ represents an integer part of the value corresponding to a value of COUNTER 2 divided by 2 and LSB represents a value of least significant bit.

If LSB of COUNTER 2=0, read-out will be performed at:

$$\text{ADDRESS} = \text{COUNTER 1} \quad (12)$$

from the zero-cross memory circuit 14, $$\text{ADDRESS} = \text{COUNTER 1} + \text{COUNTER } 2_2 \quad (13)$$

from the right side zero-cross memory circuit 24, and $$\text{ADDRESS} = \text{COUNTER 1} + \text{S} - \text{COUNTER } 2_2 \quad (14)$$

from the left side zero-cross memory circuit 34. If LSB of COUNTER 2=1, read-out will be performed at, $$\text{ADDRESS} = \text{COUNTER 1} \quad (15)$$

from the central zero-cross memory circuit 14, $$\text{ADDRESS} = \text{COUNTER 1} + \text{COUNTER } 2_2 + 1 \quad (16)$$

from the right side zero-cross memory circuit 24, and $$\text{ADDRESS} = \text{COUNTER 1} + \text{S} - \text{COUNTER } 2_2 \quad (17)$$

from the left side zero-cross memory circuit 34.

A routine of read-out will be described in reference with FIGS. 10.

The procedure to read-out and compare the data will be described in reference with FIG. 10(a)-10(c), in which a portion corresponding to six pixels picked out from each line sensor is shown and it is assumed that the coincidence detection of the zero-cross points is performed at the location indicated by a solid line. Referring to FIG. 10(a), a zero-cross point appears in the secondary difference signal $J_C$ of the pixels $W_{c+2}$ and $W_{c+3}$ for the output signal $I_C$ which reflects the luminance distribution of the scene picked up by the central line sensor 10b. Similarly, a zero-cross point appears in the secondary difference signal $J_L$ of the pixels $W_{l+2}$ and $W_{l+3}$ for the output signal $I_L$ from the left side line sensor 30b and a zero-cross point appears in the secondary difference signal $J_R$ of the pixels $W_{r+3}$ and $W_{r+4}$ for the output signal $I_R$ from the right side line sensor 20b.

More specifically, as indicated by hatched arrows in FIG. 10(a), both for the central line sensor 10b and for the left side line sensor 30b, the location at which the zero-cross point detection is performed coincides with the location at which the zero-cross actually exists. For the right side line sensor 20b, however, the zero-cross point exists at the location indicated by a blank arrow and is not in coincidence with the location at which the zero-cross point detection is performed. Accordingly, no coincidence of the data is detected so long as the secondary difference signal of this location for detection and the conclusion at the previously mentioned step 903 will be NO.

Figure 10A:
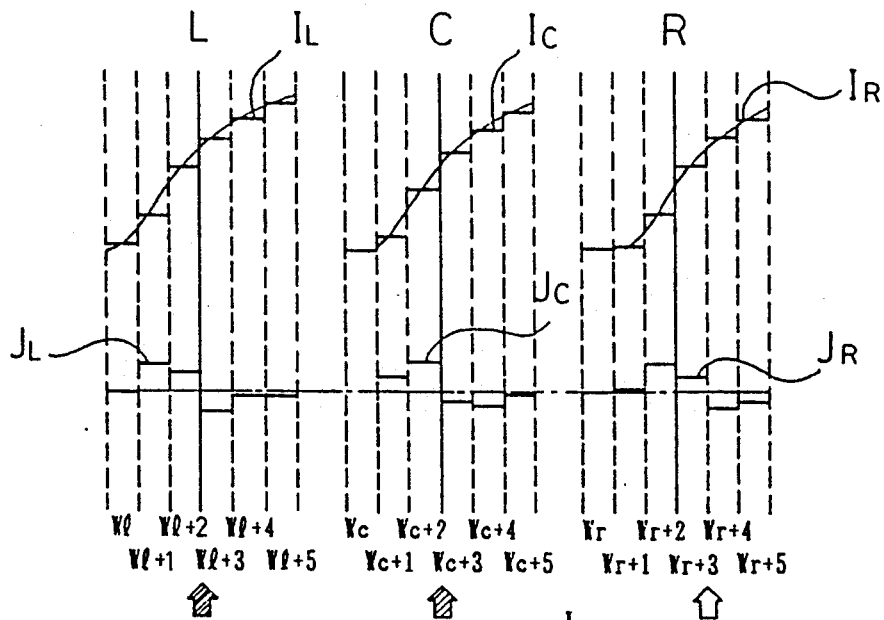
FIG. 10(a), FIG. 10(b), FIG. 10(c) is a diagram illustrating the procedure executed in Embodiment 1 to read and compare the data stored in the respective zero-cross memory circuits.
Figure 10B:
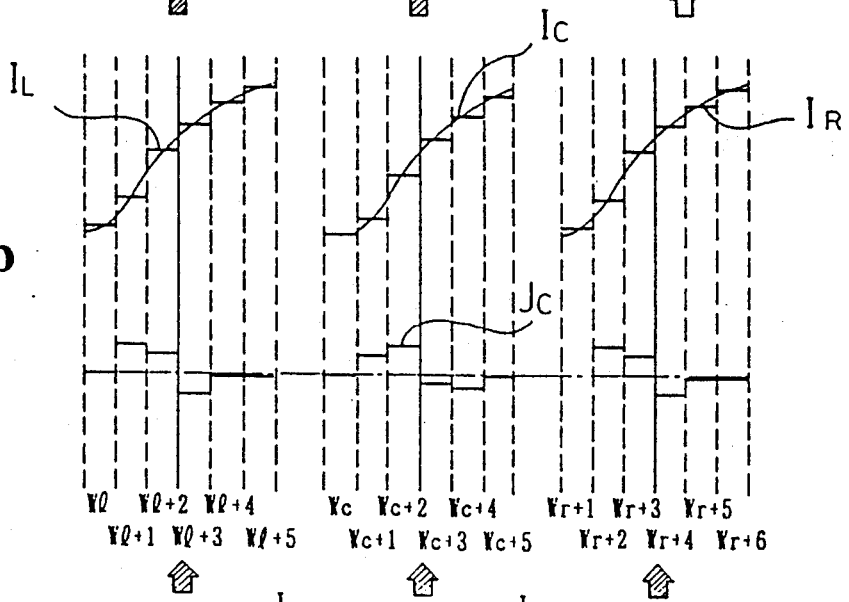
Figure 10C:
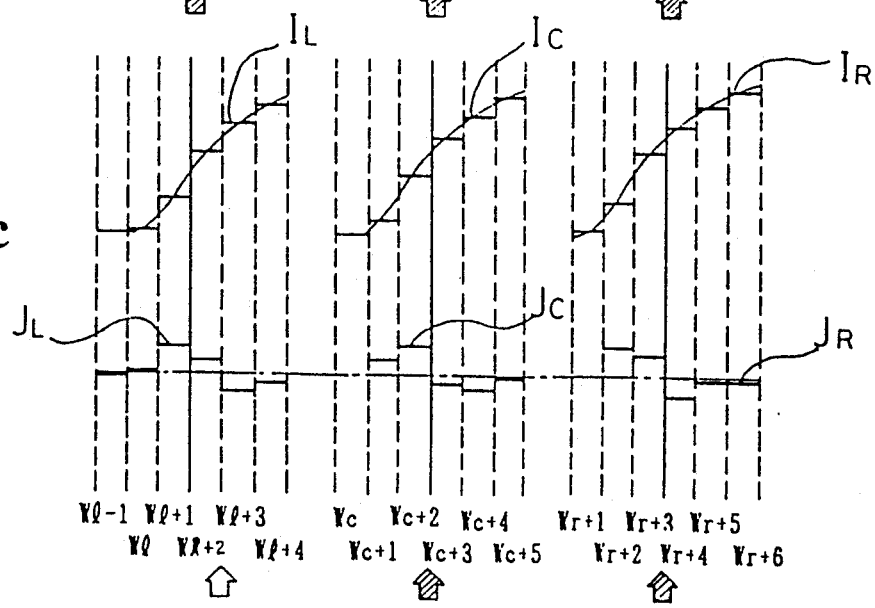

By simultaneously shifting the output signals from the right side line sensor 20b and the left side line sensor 30b by an amount corresponding to one pixel with respect to the output signal from the central line sensor 10b selected as the reference line sensor, the state of FIG. 10(a) is brought into the state of FIG. 10(c), in which the zero-cross point appearing in the secondary difference signal $J_R$ of $W_{r+3}$ and $W_{r+4}$ for the right side line sensor 20b coincides with the zero-cross point appearing in the secondary difference signal $J_C$ of $W_{c+3}$ for the central line sensor 10b as indicated by hatched arrows and, for the left side line sensor 30b, the zero-cross point appears in the secondary difference signal $J_L$ of $W_{l+2}$ and $W_{l+3}$ as indicated by a blank arrow. In other words, no zero-cross point exists in the secondary difference signal $J_L$ of $W_{l+1}$ and $W_{l+2}$ and, therefore, no coincidence of the data is detected when the central line sensor 10b is fixed as the reference line sensor and the output signals from the right and left side line sensors are simultaneously shifted by an amount corresponding to one pixel. If an error is involved in quantization, there may practically exist a location at which zero-cross points associated with those three line sensors 10b, 20b, 30b coincide with one another, as shown by FIG. 10(b).

However, the zero-cross data relating to the right side line sensor 20b and the zero-cross data relating to the left side line sensor 30b are alternately read and compared, since read-out of the addresses is performed according to the equations (12) through (17). Specifically, only the zero-cross data relating to the output signal from the right side line sensor 20b is shifted and thereby the state of FIG. 10(b) is obtained, in which a coincidence of the zero-cross points in the secondary difference signal $J_C$ of $W_{c+2}$ and $W_{c+3}$ for the output signal from the central line sensor 10b, the secondary difference signal $J_R$ of $W_{r+3}$ and $W_{r+4}$ for the output signal from the right side line sensor 20b and the secondary difference signal $J_L$ of $W_{l+2}$ and $W_{l+3}$ for the output signal from the left side line sensor 30b, as indicated by hatched arrows. Accordingly, a coincidence of the zero-cross data is detected even when an error is involved in quantization.

The value of the second counter 60 at the moment when the zero-cross point data stored in the respective zero-cross memory circuits 14, 24, 34 coincide with one another corresponds to the amount of shift Xp in the previously mentioned equation (6) which is, in turn, stored at the step 904 into the data memory circuit 80 as the range data.

If it determined at the step 907 read-out of a predetermined shift has been completed, the routine proceeds to the step 909, then the range data which was written at the step 904 into the data memory circuit 80 is applied to an objective driving mechanism so as to move the objective to a given position and thereby to focus the objective on a scene to be photographed.

With this Embodiment 1, the data coincidence can be reliably detected even if the spatial quantization is involved with an error when the scene to be photographed is picked up by the photosensors, since one of those three zero-cross data is selected as the reference zero-cross data and other two zero-cross data are alternately shifted with respect to the reference zero-cross data to compare these zero-cross data. Accordingly, substantially no range finding occurs.

EMBODIMENT 2.1

FIGS. 11 through 13 show Embodiment 2.1 relating to the previously described coincidence detecting circuit 70. FIG. 11 is a circuit block diagram similar to FIG. 1 and it should be understood that the parts similar to those in FIG. 1 are designated by similar reference numerals.

According to this Embodiment 2.1, the output terminal of the coincidence detecting circuit 70 is connected to the control circuit 40 via a coincidence data link 70a serving to transmit a signal indicating the zero-cross data coincidence. The control circuit 40 applies a coincidence detection command to the coincidence detecting circuit 70 via a detection data link 70b.

The coincidence detecting circuit 70 is exemplarily shown by FIG. 12 in which the output of the central zero-cross memory circuit 14 is designated by C, the output of the right side zero-cross memory circuit 24 is designated by R and the output of the left side zero-cross memory circuit 34 is designated by L. These outputs are applied to respective 4-bit shift resisters and then applied together with Q outputs from respective D flip-flops to an OR circuit 71 in association with the zero-cross memory gate 14, to an OR circuit 72 in association with the zero-cross memory circuit 24 and to an OR circuit 73 in association with the zero-cross memory circuit 34. Outputs from these OR gate 71, 72, 73 are applied together to an AND gate 74 and output the of this AND gate 74 is used as the coincidence detection data. Accordingly, the zero-cross data provided from the respective zero-cross memory circuits 14, 24, 34 are compared with one another at five addresses thereof so that the pixel locations of each photosensor 10, 20, 30, i.e., the memory addresses for zero-cross behavior may have a certain tolerance for coincidence detection. It should be understood that the data corresponding to the zero-cross points are stored as "H".

FIG. 13 shows an alternative embodiment of the coincidence detecting circuit 70, in which the output of the central zero-cross memory circuit 14 is applied to a 4-bit shift resister and then applied together with Q outputs of respective D flip-flops to an OR gate 75. Output of the right side zero-cross memory circuit 24 and output of the left side zero-cross memory circuit 34 are applied to respective 2-bit shift resisters. The output of the OR gate 75 is applied together with output of the shift resister associated with the right and left zero-cross memory circuits 24, 34 to an AND gate 76 and output the of this AND gate 76 is used as the coincidence detection data. The embodiment shown by FIG. 12 has the disadvantage that the range finding data may considerably deviate from the actual range to the scene to be photographed because each of the central zero-cross memory circuit 14, the right side zero-cross memory circuit 24 and the left side zero-cross memory circuit 34, contain a certain width tolerance for coincidence detection and the address width over which the coincidence detection is performed is correspondingly enlarged. With the embodiment shown by FIG. 13, on the other hand, no large deviation of the range finding data from the actual range occurs because there is provided a width tolerance only for the output from the central zero-cross memory circuit 14.

Figure 8:
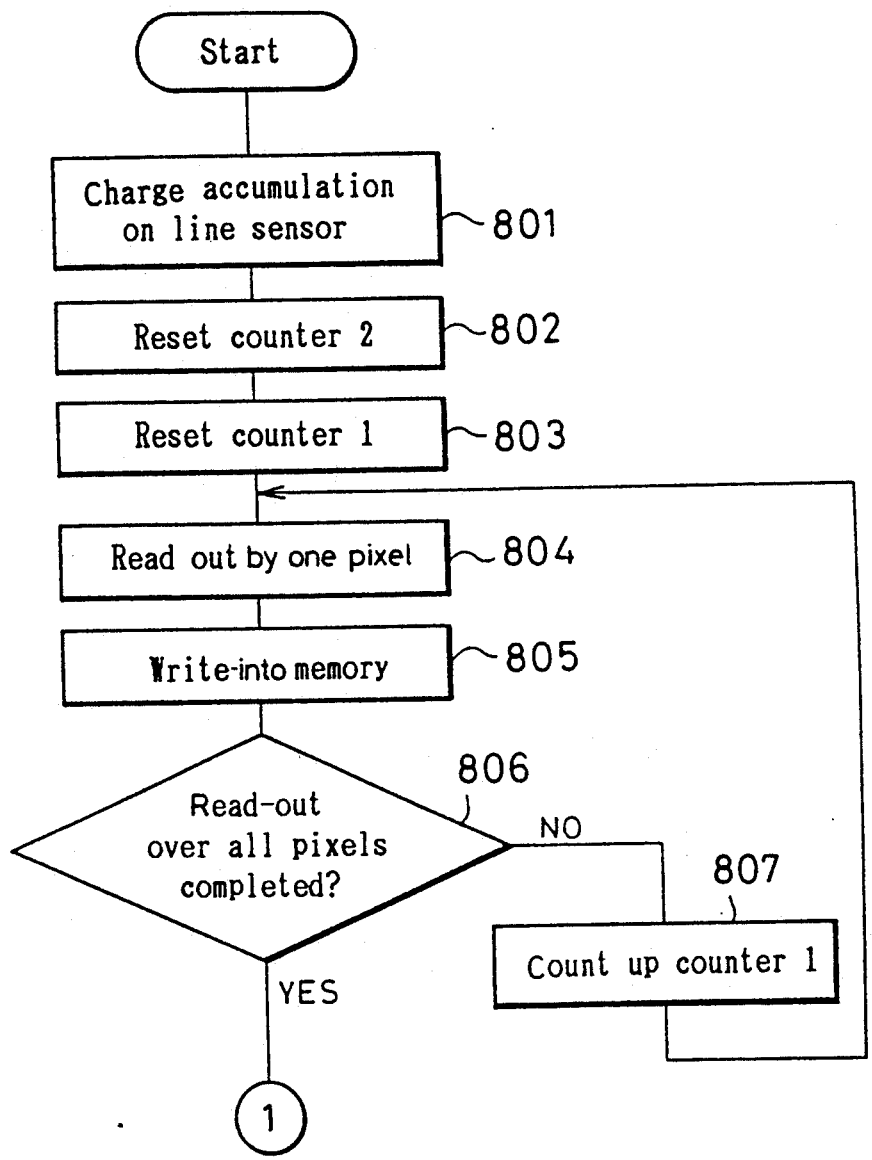
FIG. 8 is a flow chart of the program routine executed in Embodiments 1, 2.1, 3.1 and 4.1 to write the data from the line sensor into the zero-cross memory circuit.
Figure 9:
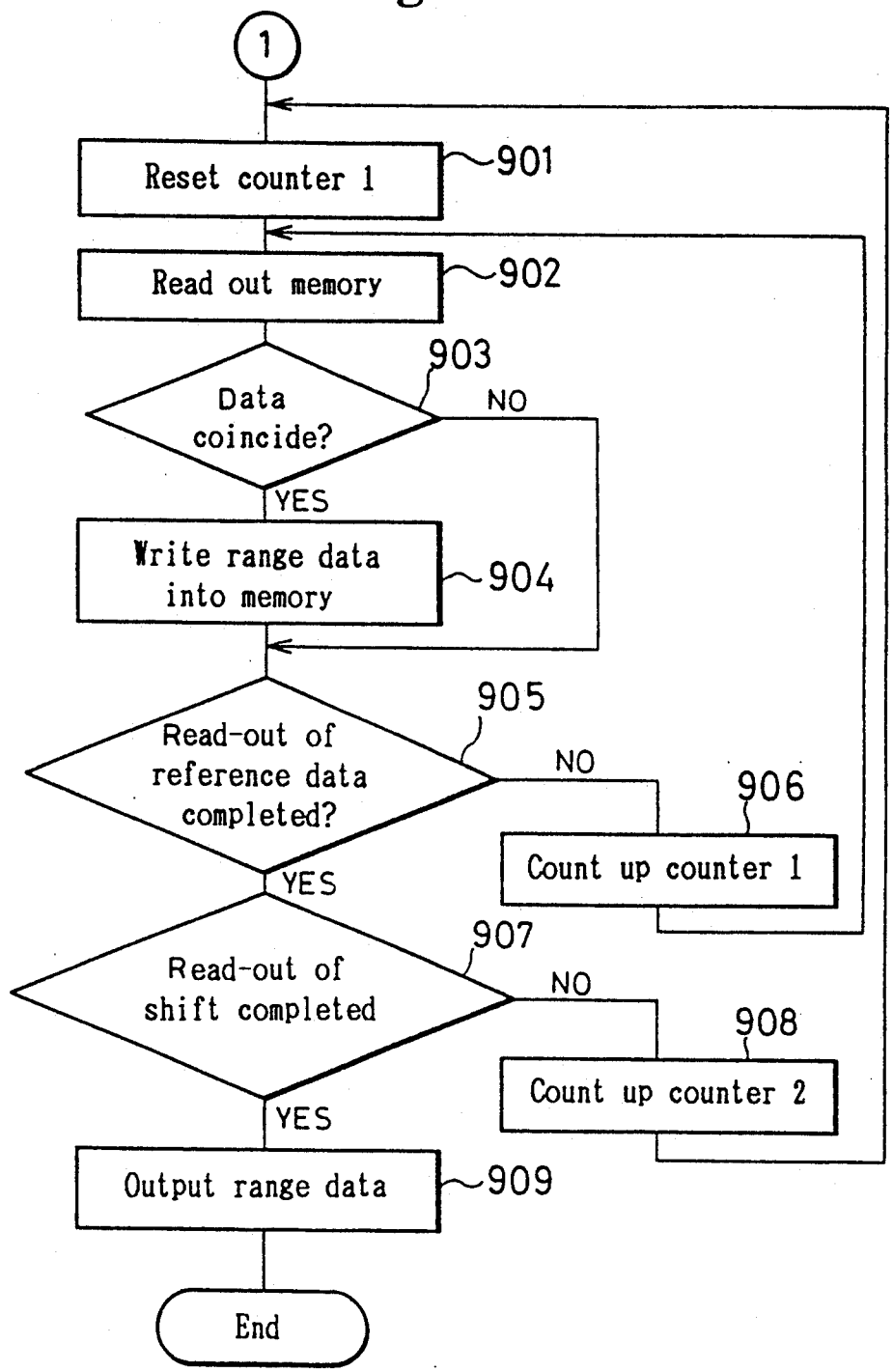
FIG. 9 is a flow chart of the routine executed in Embodiments 1, 2.1 and 2.2 to read the given data from the zero-cross memory circuit.

Procedures for write-in and read-out of the information concerning a luminance distribution on the scene to be photographed are similar to those as illustrated by FIGS. 8 and 9, respectively as described herein below.

More specifically, the data are read out by the address computing circuits 15, 25, 35 at respective addresses given by the previously mentioned equations (9), (10), (11) as following:

$$\text{ADDRESS} = \text{COUNTER 1} \tag{18}$$

for the central zero-cross memory circuit 14, $$\text{ADDRESS} = \text{COUNTER 1} + \text{COUNTER 2} \tag{19}$$

for the right side zero-cross memory circuit 24, and $$\text{ADDRESS} = \text{COUNTER 1} + S - \text{COUNTER 2} \tag{20}$$

for the left side zero-cross memory circuit 34. If should be understood that S in the equation (20) represents a constant. A relationship between the write-in address and the read-out address will be described.

With the count signal of the second counter 60 being set to 0 (COUNTER 2=0), the data stored at the addresses corresponding to the respective pixels in the line sensors 10b, 20b, 30b are successively compared one to another with the first counter 50 being successively incremented from 0 to (W−1+D) (step 906) and thereby a coincidence of these data is detected. Accordingly, if COUNTER 2=0, the address will be incremented from 0 to (W−1+D) for the pixels in the central line sensor 10b as well as in the right side line sensor 20b and from S to (S+W−1+D) for the pixels in the left side line sensor 30b. Then, the second counter 60 is incremented (step 908) and the data stored at the addresses corresponding to the respective pixels in the line sensors 10b, 20b, 30b are compared to one another as the first counter 50 is successively incremented from 0 to (W−1+D) (step 906) with the count signal of the second counter 60 being set to 1 (COUNTER 2=1), and thereby a coincidence of the data is detected. Accordingly, when COUNTER 2=1, the address will be incremented from 0 to (W−1+D) for the central line sensor 10b, from 1 to (W+D) for the right side line sensor 20b and from (S−1) to (S+W−2+D) for the left side line sensor 30b. In other words, the memory data in the right side zero-cross memory circuit 24 and the left side zero-cross memory circuit 34 will be subjected to the coincidence detection with a shift of one pixel with respect to the memory data in the central zero-cross memory circuit 14. It should be understood that the above-mentioned "D" is a constant determined by a delay of detection and "D"=2 in the embodiments as shown by FIGS. 12 and 13.

Additionally, the coincidence detecting circuit as shown by FIGS. 12 or 13 provides a width tolerance for the address being subjected to comparison in coincidence detection. With respect to the address of the reference zero-cross data, plural addresses of the other two zero-cross data are used.

When the coincidence detection is performed using Embodiment 2.1 based on the zero-cross data obtained from at least one photosensor, a range finding data concerning a particular scene to be photographed can be reliably obtained even if an error is involved in mounting of this photosensor or if such error is varied due to a specular change, since not only the pixel locations corresponding to the normal zero-cross data but also a predetermined width tolerance adjacent both sides of the above-mentioned normal pixel locations are used for the coincidence detection.

EMBODIMENT 2.2

FIGS. 14 through 18 show Embodiment 2.2 comprising a circuit arrangement which is different from that of Embodiment 2.1.

Figure 15:
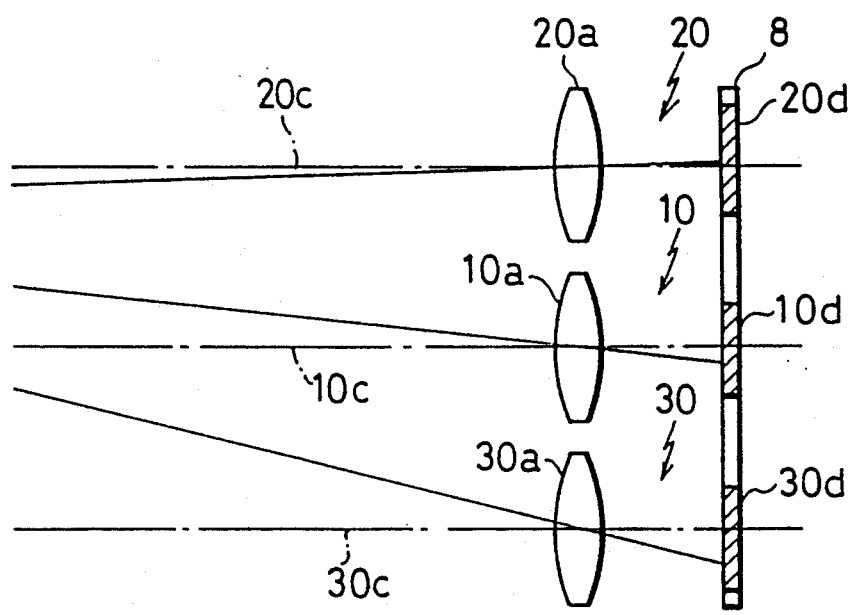
FIG. 15 is a side view schematically showing the photosensors in Embodiments 2.2, 3.2 and 4.2.

According to this Embodiment 2.2, the photosensors 10, 20, 30 are provided by a single line sensor which, in turn, comprises a photodetector array including an appropriate number of pixels arranged side by side, and three imaging lenses combined with the line sensor. Referring to FIG. 15, there are provided on the front side of the photographic camera three imaging lenses 10a, 20a, 30a so that light rays emitted from a scene to be photographed pass through these imaging lenses 10a, 20a, 30a and imaged on corresponding zones of the lines sensor 8 placed behind the imaging lenses. The line sensor 8 is accordingly divided into three sections, i.e., the central section 10d, the right side section 20d and the left side section 30d. The photosensors 10, 20, 30 are designated hereinafter as the central sensor 10, the right side sensor 20 and the left side sensor 30 with optical axes 20c, 30c of the right side sensor 20 and the left side sensor 30, respectively, being arranged symmetrically with respect to an optical axis 10c of the central sensor 10.

Figure 14:
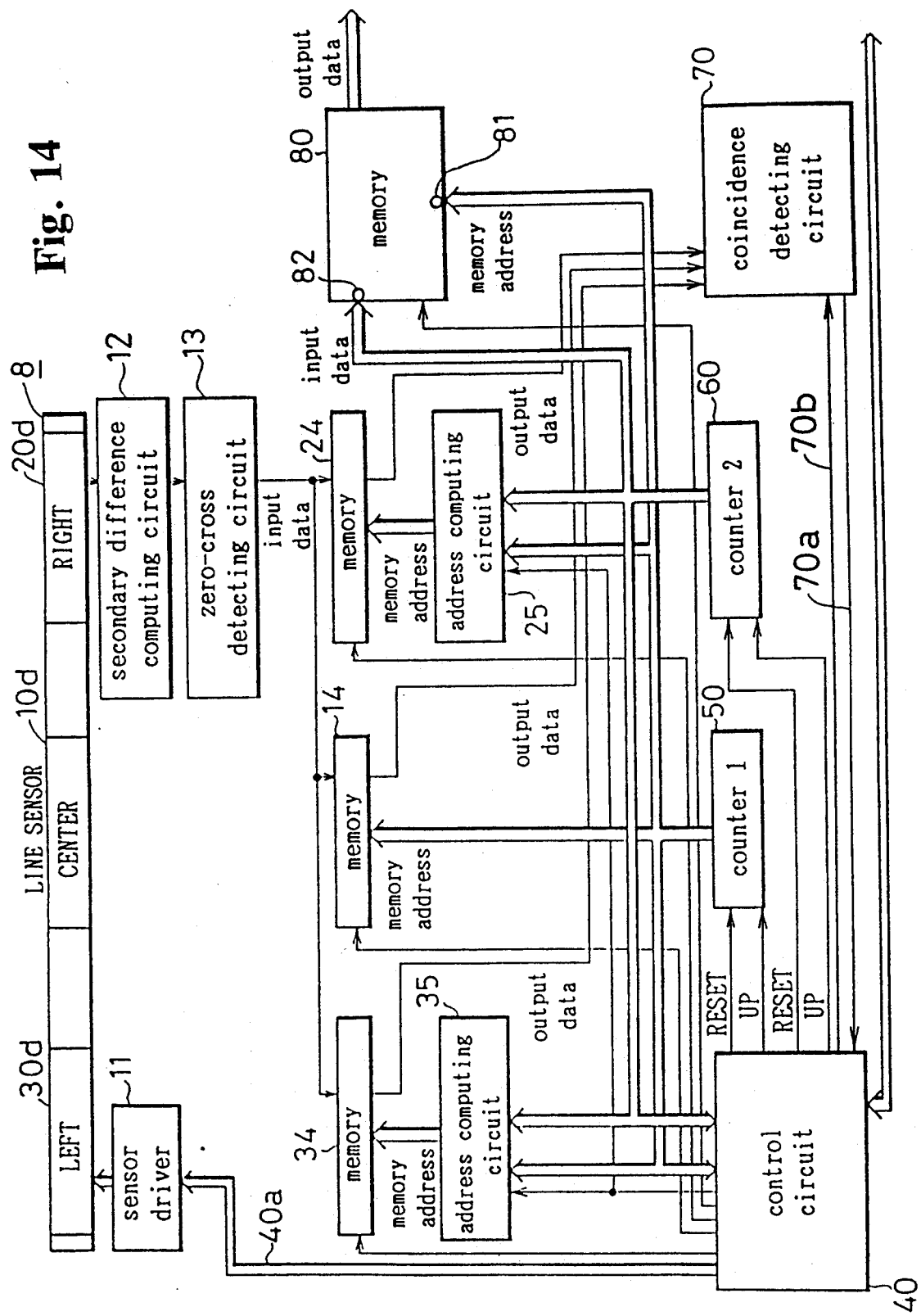
FIG. 14 is a circuit block diagram showing Embodiment 2.2 of the range finder for a passive type autofocusing device constructed in accordance with the invention.

The line sensor 8 is applied, as illustrated in FIG. 14, with a drive signal from the sensor driver 11 and begins to pick up the light rays coming from the scene based on the drive signal. The sensor driver 11 is connected to the control circuit 40 via the drive control signal link 40a and controlled by a drive control signal provided from the control circuit 40.

As will be apparent from FIG. 14, the secondary difference computing circuit 12 is connected to the output terminal of the line sensor 8 and the secondary difference computing circuit 12 computes the secondary difference of the luminance distribution signals which have been obtained by the line sensor 8. The secondary difference computing circuit 12 is identical to that used in Embodiment 1 illustrated by FIG. 3 and computes the secondary difference according to the previously mentioned equation (8).

The output signal of the secondary difference computing circuit 12 is applied, as shown in FIG. 14, to the zero-cross detecting circuit 13 which then detects the zero-cross point of the secondary difference obtained by this secondary difference computing circuit 12. This zero-cross detecting circuit 13 is identical to that used in Embodiment 1 illustrated by FIG. 5.

The zero cross behavior signal waveform obtained by the zero-cross detecting circuit 13 is divided into three portions corresponding to the central section 10d, the right side section 20d and the left side section 30d of the line sensor 8, respectively, then separately applied to and stored in the zero-cross memory circuits 14, 24, 34, respectively. These zero-cross behaviors are then stored at the addresses which are output from the address computing circuits 25, 35 according to the pixel locations for the right side section 20d and the left side section 30d, and at the address according to the count signal (COUNTER 1) of the first counter 50 for the central section 10d of the line sensor 8. Specifically, the count signal (COUNTER 1) of the first counter 50 is applied to the address computing circuits 25, 35 and also to the central memory circuit 14 with successive increments and the zero-cross behavior signal waveforms are stored at the respective addresses corresponding to the respective pixels in accordance with the following equations:

$$\text{ADDRESS} = \text{COUNTER 1} \quad (21)$$

for the central memory circuit 14, $$\text{ADDRESS} = \text{COUNTER 1} \quad (22)$$

for the right side memory circuit 24, and $$\text{ADDRESS} = \text{COUNTER 1} \quad (23)$$

for the left side memory circuit 34.

Count signals (COUNTER 2) from the second counter 60 are applied to the address computing circuits 25, 35. Count up and reset of this second counter 60 are performed under control of output signals from the control circuit 40. The second counter 60 increments the address for every read-out of data from the zero-cross memory circuits 24, 34. These address computing circuits 25, 35 are supplied from the control circuit 40 with address processing information on the basis of which the address computing circuits 25, 35 provide predetermined write/read signals into and from the zero-cross memory circuits 24, 34.

Output sides of the zero-cross memory circuits 14, 24, 34 are connected to the coincidence detecting circuit 70 of which the output side is connected, in turn, to the control circuit 40 via the coincidence information link 70a. The control circuit 40 supplies the coincidence detection command to the coincidence detecting circuit 70 via the detection data link 70b.

The coincidence detecting circuit 70 is of the same arrangement as that of the coincidence detecting circuit 70 in Embodiment 2.1 as shown by FIGS. 12 or 13.

The count signal from the first counter 50 is applied to an address port 81 of a data memory circuit 80 while the count signal from the second counter 60 is applied to a range data port 82 of the data memory circuit 80. Both the count signals from the first counter 50 and the second counter 60 are also applied to the control circuit 40. The control circuit 40 supplies the data memory circuit 80 with a data memory signal on the basis of which the address data and the range data are stored in the data memory circuit 80.

Figure 16:
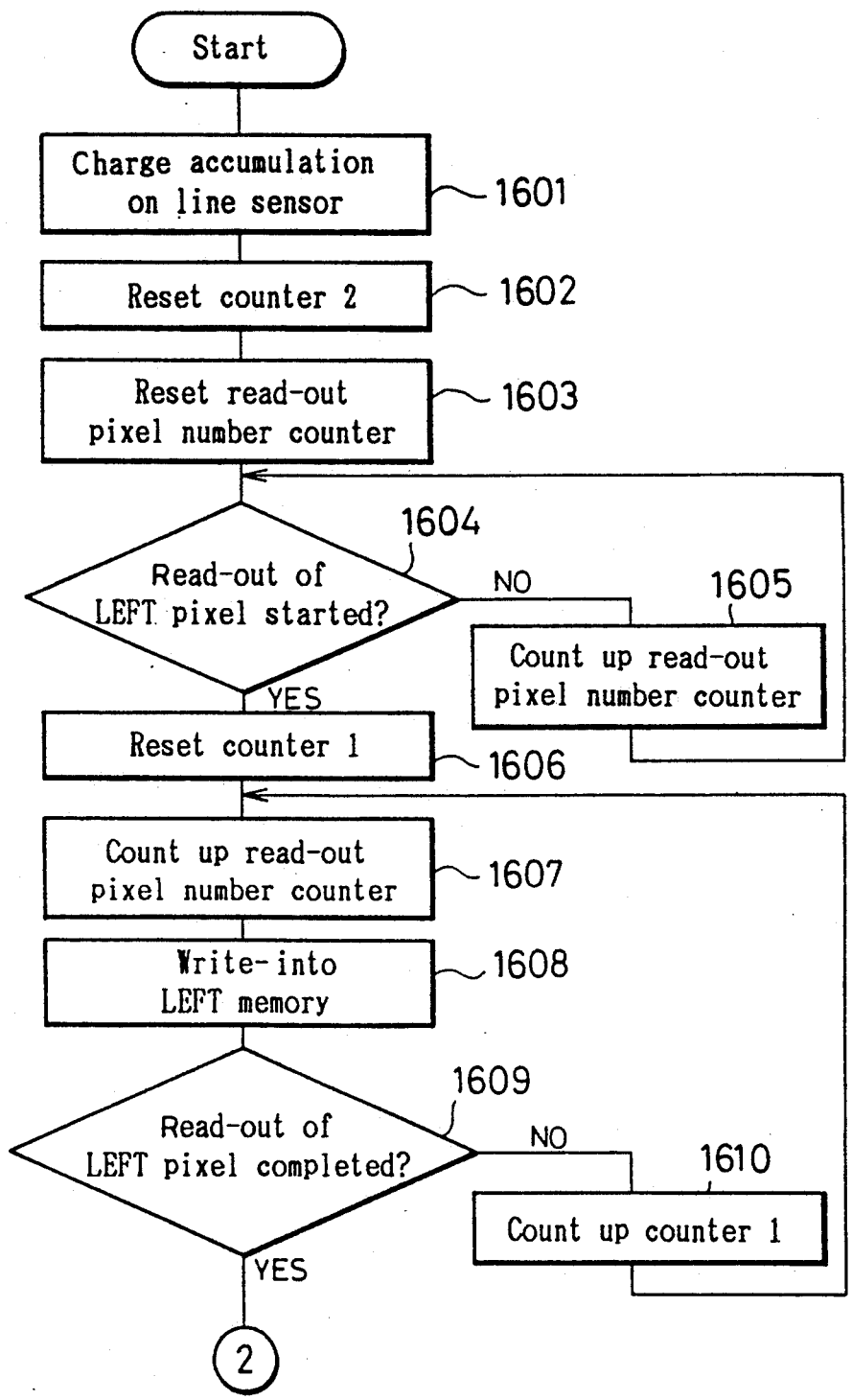
FIG. 16 is a flow chart of the program routine executed in Embodiments 2.2, 3.2 and 4.2 to write the data obtained from the line sensor into the zero-cross memory circuit, particularly for the left side section of the line sensor.
Figure 17:
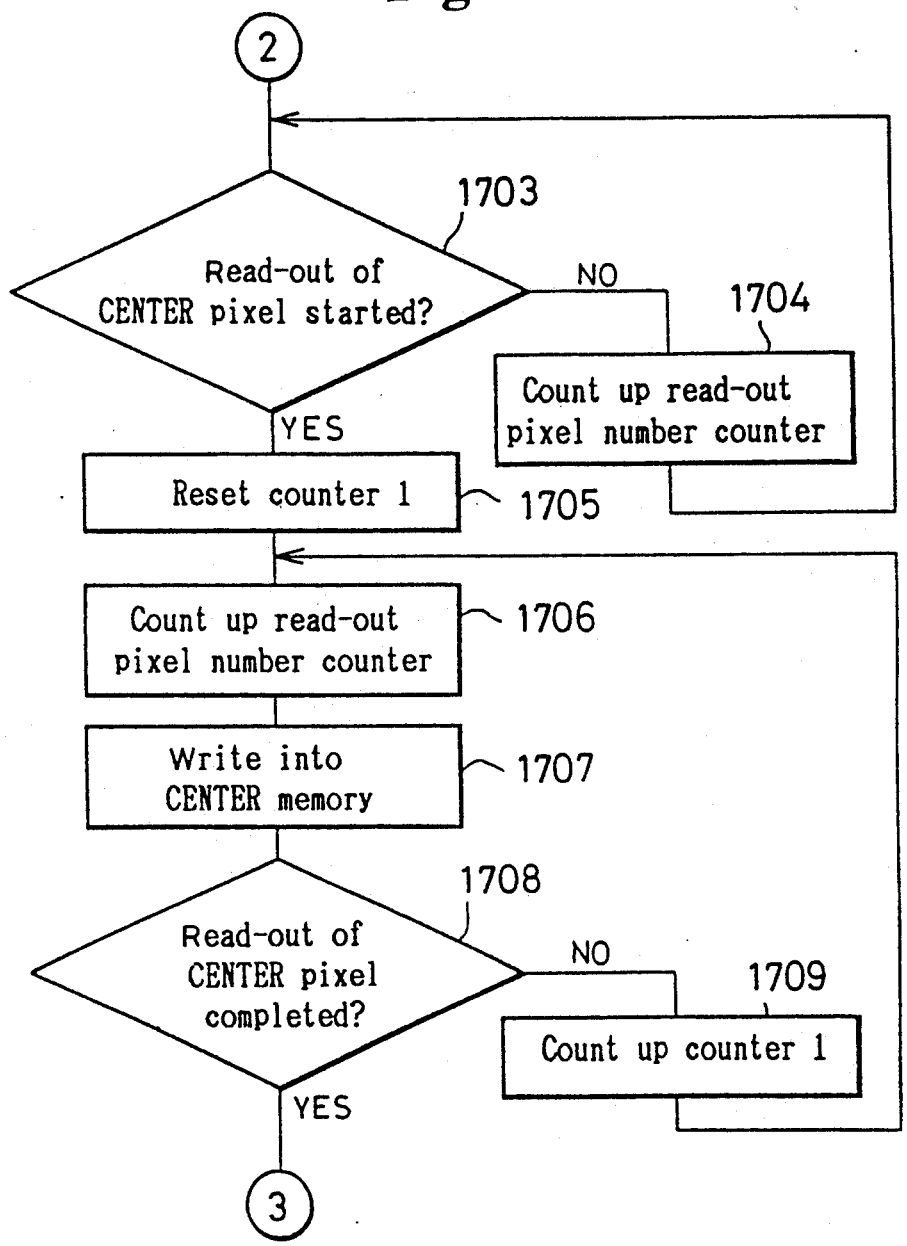
FIG. 17 is a flow chart of the program routine executed in Embodiments 2.2, 3.2 and 4.2 to write the data obtained from the line sensor into the zero-cross memory circuit, particularly for the central section of the line sensor.
Figure 18:
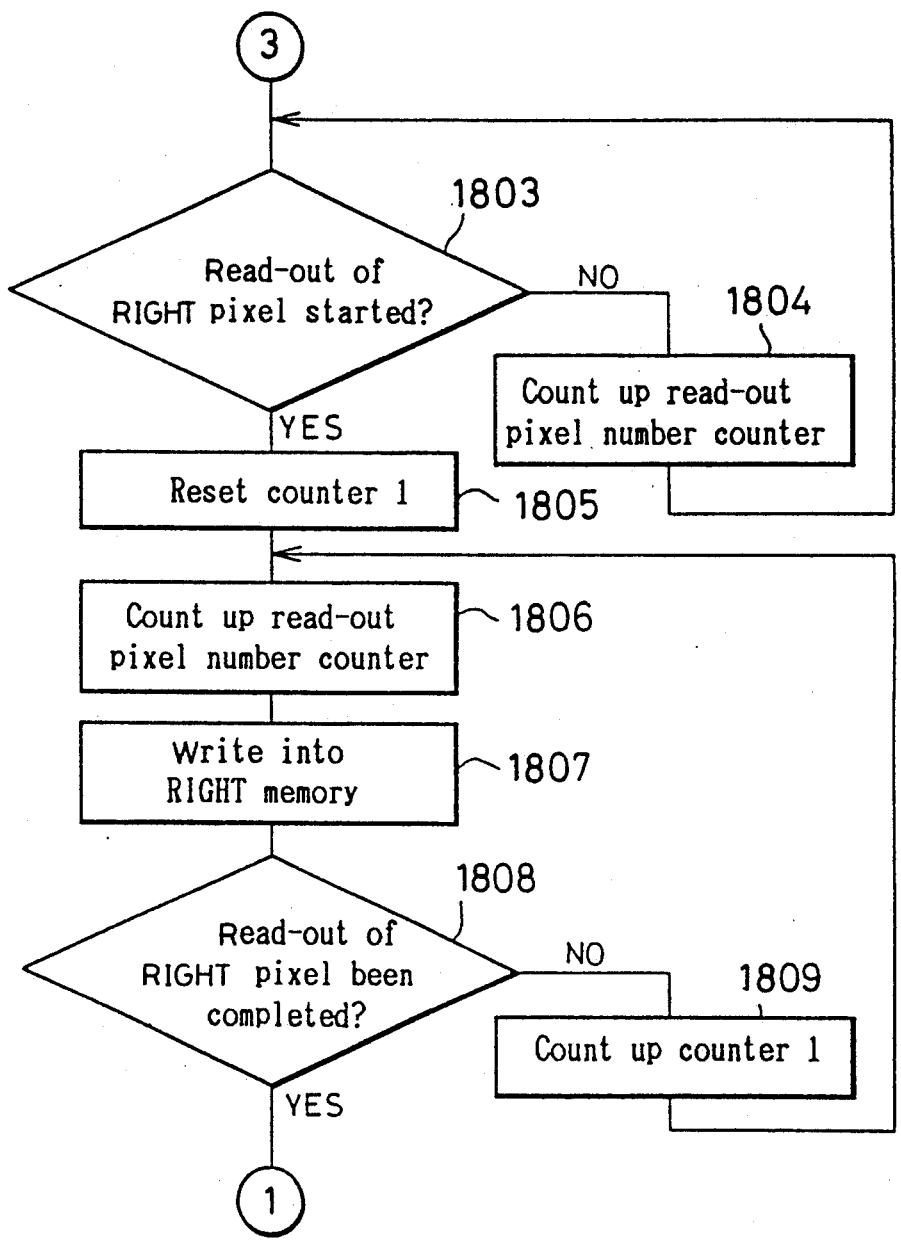
FIG. 18 is a flow chart of the program routine executed in Embodiments 2.2, 3.2 and 4.2 to write the data obtained from the line sensor into the zero-cross memory circuit, particularly for the right side section of the line sensor.

Now referring to FIGS. 16 and 18, a routine to write and read the luminance information memory for a scene to be photographed will be described.

Upon start of range finding, charge accumulation takes place on the line sensor 8 (step 1601), then the second counter 60 is reset (step 1602), and a read-out pixel number counter (not shown) provided within the control circuit 40 is reset (step 1603).

It is determined from a count value of the read-out pixel number counter whether read of a first pixel in the left side section 30d of the single line sensor 8 started or not (step 1604) and the pixels are output one by one (step 1605) until data corresponding to the first pixel begins to be read out. When the first pixel begins to be read out, the first counter 50 is reset (step 1606). Data corresponding to one pixel in the left side section 30d of the line sensor 8 is read out (step 1607) and this read-out data is written into the left side zero-cross memory circuit 34 (step 1608). It should be understood that a zero-cross detection is executed between the steps 1607 and 1608. Next, the routine proceeds to a step 1609 to determine whether read-out concerning all the pixels has been completed or not, based on a value of the first counter 50. If not, the routine proceeds to a step 1610 to count up the first counter 50 and then returns to the step 1607 to read one pixel, following by writing it into the left side zero-cross memory circuit 34 (step 1608). The data written into the zero-cross memory circuit 34 is stored at the address assigned by the address computing circuit 35, based on the count signal from the first counter 50. The address at which the data is to be stored is assigned according to the above-mentioned equation (23).

If read-out of all the pixels in the left side section 30d of the line sensor 8 has been completed and thus conclusion of this step 1609 is YES, the routine proceeds to a step 1703 (FIG. 17) to detect read-out of the first pixel in the central section 10d of the line sensor based on a count value of the read-out pixel number counter and the pixels are output one by one (step 1704) until read-out of the first pixel starts. If read-out of the first pixel has started, the first counter 50 is reset (step 1705) and then the same steps as the steps 2307 through 2310 are repeated. Namely, the pixels in the central section 10d of the line sensor are read out one by one (step 1706) in parallel with the zero-cross detection, then written into the central zero-cross memory circuit 14 (step 1707) and it is determined whether all the pixels in the central section 10d of the line sensor have been completely read out, based on the count value of the first counter 50 (step 1708) while the first counter 50 is counted up (step 1709). The address at which the data is to be stored is assigned according to the previously mentioned equation (21).

If all the pixels in the central section 10d of the line sensor have been read out and conclusion of the step 1708 is YES, the routine proceeds to a step 1803 (FIG. 18) to detect read-out of the first pixel in the right side section 20d of the line sensor, based on the count value of the read-out pixel number counter while the pixels are output one by one (step 1804). If read-out of the first pixel has started, the first counter 50 is reset (step 1805). Then, the same routine as those for the left side section 30d and the central section 10d of the line sensor 8 is repeated for the right side section 20d of the line sensor 8. More specifically, the pixels in this right side section 20d are read out one by one (step 1806) in parallel with the zero-cross detection, then written into the right side zero-cross memory circuit 24 (step 1807) and it is determined whether all the pixels in the right side section 20d of the line sensors have been completely read out (step 1808) while the first counter 50 is counted up (step 1809). The data written into the right side zero-cross memory circuit 24 is stored at the address assigned according to the equation (22), based on the count signal from the first counter 50.

If read-out all the pixels in the line sensor 8 has been completed and thus conclusion of the step 1808 is YES, a routine similar to the routine comprising steps 901 through 909 as illustrated by FIG. 9 will be followed. Specifically, the memory data are read out from the respective zero-cross memory circuits 14, 24, 34 and applied to the coincidence detecting circuit 70 which then detects a coincidence of the data read out from the central zero-cross memory circuit 14, the right side zero-cross memory circuit 24 and the left side zero-cross memory circuit 34, respectively. Upon completion of the shift read-out, the range data are output from the data memory circuit 80 (step 909).

Read-out of the data stored in the respective zero-cross memory circuits 14, 24, 34 in the procedure of coincidence detection is performed by cooperation of the first counter 50 with the address computing circuits 25, 35 at the addresses given by following equations corresponding to the previously mentioned equations (21), (22), (23):

$$\text{ADDRESS} = \text{COUNTER 1} \quad (24)$$

for the central zero-cross memory circuit 14, $$\text{ADDRESS} = \text{COUNTER 1} + \text{COUNTER 2} \quad (25)$$

for the right side zero-cross memory circuit 24, and $$\text{ADDRESS} = \text{COUNTER 1} + S - \text{COUNTER 2} \quad (26)$$

for the left side zero-cross memory circuit 34. It should be understood that S in the equation (26) represents a constant. A relationship between the write-in address and the read-out address is similar to such relationship established in the case of the previous Embodiment 2.1. Specifically, the coincidence detection is performed as the first counter 50 is incremented from 0 to $(W-1+D)$, wherein "D" represents a constant determined by a delay of detection.

According to this Embodiment 2.2, both the secondary computing circuit and the zero-cross detecting circuit may be single, because there is provided a single line sensor divided into three sections. Compared to Embodiments 1 and 2.1 of the range finder using three line sensors associated with three secondary difference computing circuits and three zero-cross detecting circuits, this Embodiment 2.2 of the range finder comprises a single line sensor, a single secondary difference computing circuit and a zero-cross detecting circuit, and the number of parts may be correspondingly reduced.

EMBODIMENT 3.1

Figure 19:
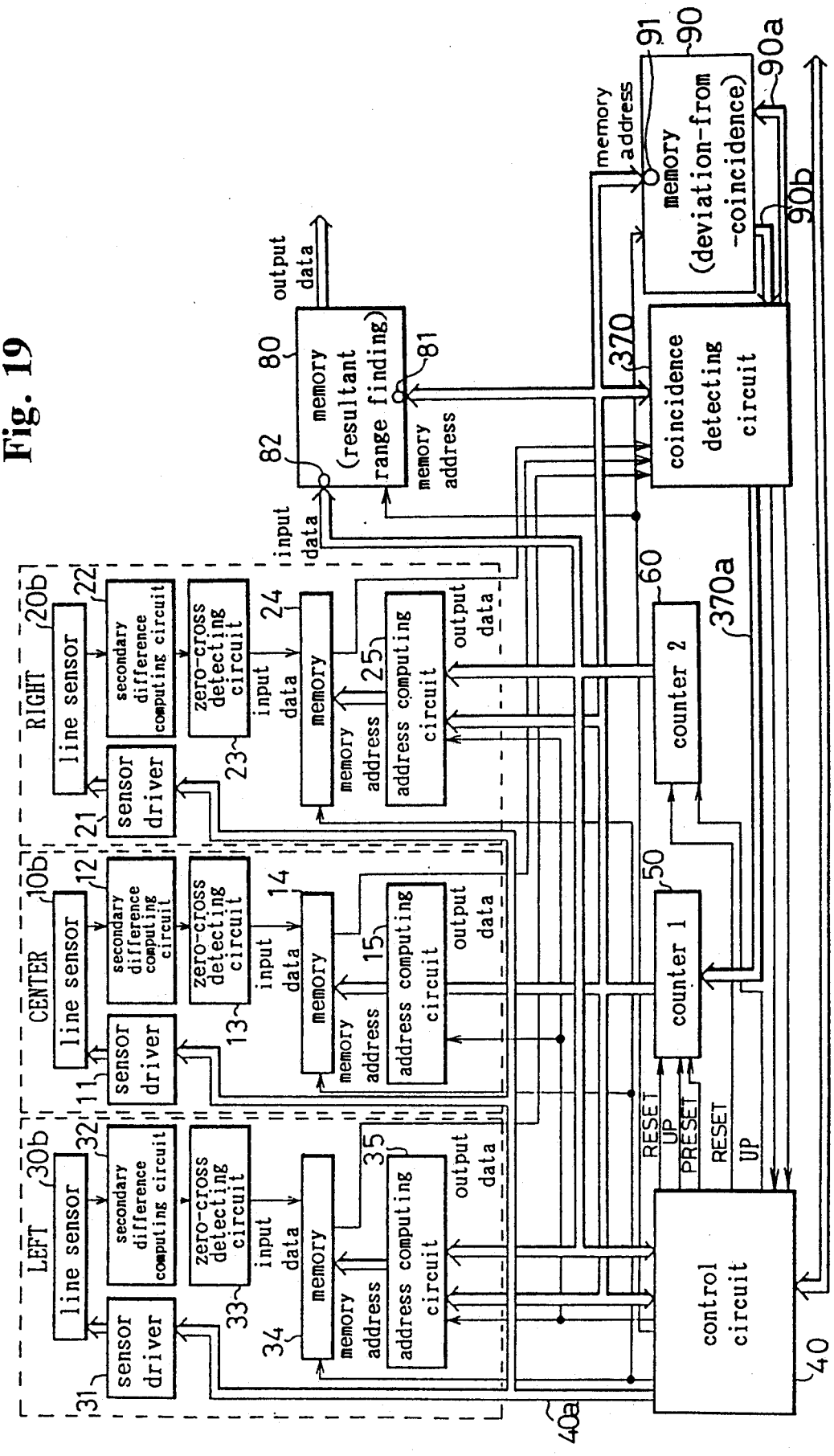
FIG. 19 is a circuit block diagram showing Embodiment 3.1 of the range finder for a passive type autofocusing device constructed in accordance with the invention.

FIGS. 19 through 24 show Embodiment 3.1. FIG. 19 is a circuit block diagram similar to FIG. 1 and parts similar to those in FIG. 1 are designated by the same reference numerals as those used in FIG. 1.

As will be apparent from FIG. 19, output sides of the zero-cross memory circuits 14, 24, 34 are connected to a coincidence detecting circuit 370 of which the output side is connected, in turn, to the control circuit 40, and the first counter 50 is applied with a scanning count signal via a preset data signal link 370a. The coincidence detecting circuit 370 is connected to a deviation-from-coincidence memory circuit 90 via deviation-from-coincidence data links 90a, 90b. The deviation-from-coincidence memory circuit 90 is adapted to store a deviation-from-coincidence corresponding to an absolute value of difference between a location of the reference zero-cross data coincidence stored in the central zero-cross memory circuit 14 which coincides with the zero-cross data stored in the right side zero-cross memory circuit 24 and the left side zero-cross memory circuit 34 to be compared with each other and a location of the compared zero-cross data of the right and left zero-cross memory circuits after this compared zero-cross data have been shifted. Count signal of the first counter 50 is applied to an address port 91 associated with the deviation-from-coincidence memory circuit 90. The deviation-from-coincidence memory circuit 90 is applied from the control circuit 40 with a data memory signal, on the basis of which the deviation-from-coincidence data is stored in the deviation-from-coincidence memory circuit 90.

Count signals from the first counter 50 are applied to the deviation-from-coincidence memory circuit 90 and simultaneously to the address port 81 of the data memory circuit 80 so that the deviation-from-coincidence correspond to the result of range finding stored in the data memory circuit 80 in one to one relationship. Count signals from the second counter 60 are applied to the range data port 82 of the data memory circuit 80. Both the count signals of the first counter 50 and the count signals of the second counter 60 are applied also to the control circuit 40 which supplies the data memory circuit 80 with a data memory signal. Based on this signal, an address data and a range data are stored in the data memory circuit 80.

Figure 20:
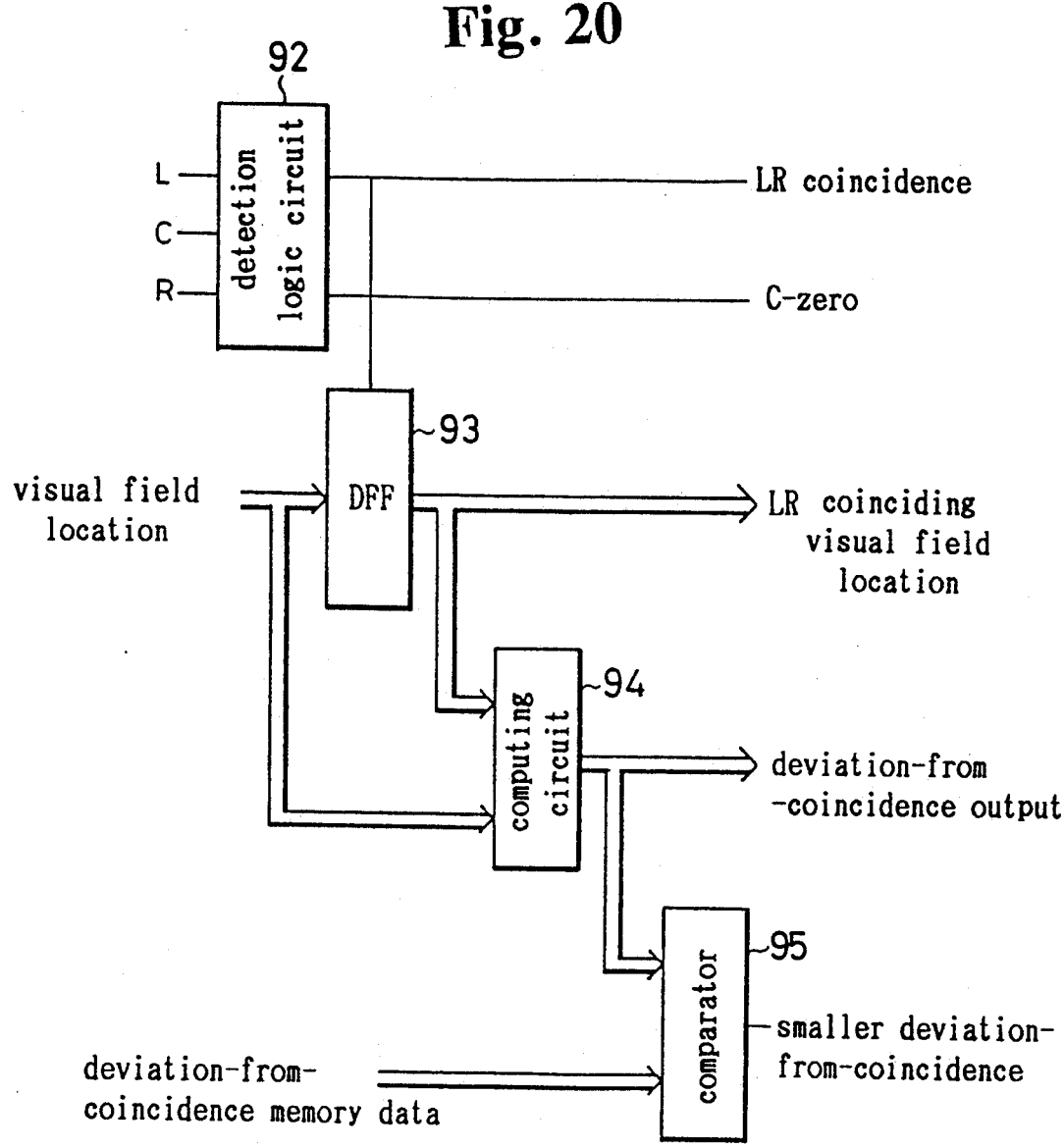
FIG. 20 is a block diagram showing a circuit used in Embodiments 3.1 and 3.2 to detect a deviation-from-coincidence in the zero-cross data.

FIG. 20 is a block diagram illustrating a procedure for detection of the deviation-from-coincidence. As illustrated, zero-cross data C, R, L of the scene luminance output from the central line sensor 10b, the right side line sensor 20b and the left side line sensor 30b based on the luminance distribution on the scene to be photographed and then stored in the respective zero-cross memory circuits 14, 24, 34 are applied together to a detection logic circuit 92. A coincidence signal generated when the zero-cross data L and R are coincident with each other is applied to a D flip-flop 93. The count value of the first counter 50 also is applied to this D flip-flop 93 and latched therein as a visual field is shifted for relational computation of C, R and L. Signals from the first counter 50 are applied also to a computing circuit 94. A specific value of the first counter signal which is latched at the moment when the signal indicating a coincidence of L and R is supplied from the detection logic circuit 92 is applied to the computing circuit 94. The detection logic circuit 92 supplies also a zero-cross data (C-zero) relating to the data C derived from the central line sensor 10b. The deviation-from-coincidence is defined by an absolute of the difference value between the count value of the first counter 50 at the moment when the C-zero is output and the count value of the first counter 50 applied from the D flip-flop 93 to the computing circuit 94 at the moment when L and R coincide with each other. This deviation-from-coincidence is applied to a comparator 95 so as to be compared with the deviation-from-coincidence previously stored in the deviation-from-coincidence memory circuit 90 and the smaller is registered into the deviation-from-coincidence memory circuit 90.

Now referring to FIGS. 8, 21 and 22, a routine to write and read the luminance information memory for a scene to be photographed will be described.

In the same manner as has previously been described, the steps 801 through 805 are executed. If read-out of the data corresponding to all the pixels has been completed and conclusion of the step 806 is YES, the routine proceeds to a step 2101 (FIG. 21) to reset the first counter 50. Next, data area read out from the zero-cross memory circuits 14, 24, 34 (step 2102) and the coincidence detecting circuit 370 determines whether the data from the central zero-cross memory circuit 14, the right side zero-cross cross memory circuit 24 and the left side zero-cross memory circuit 34 coincide with one another or not (step 2200).

Figure 21:
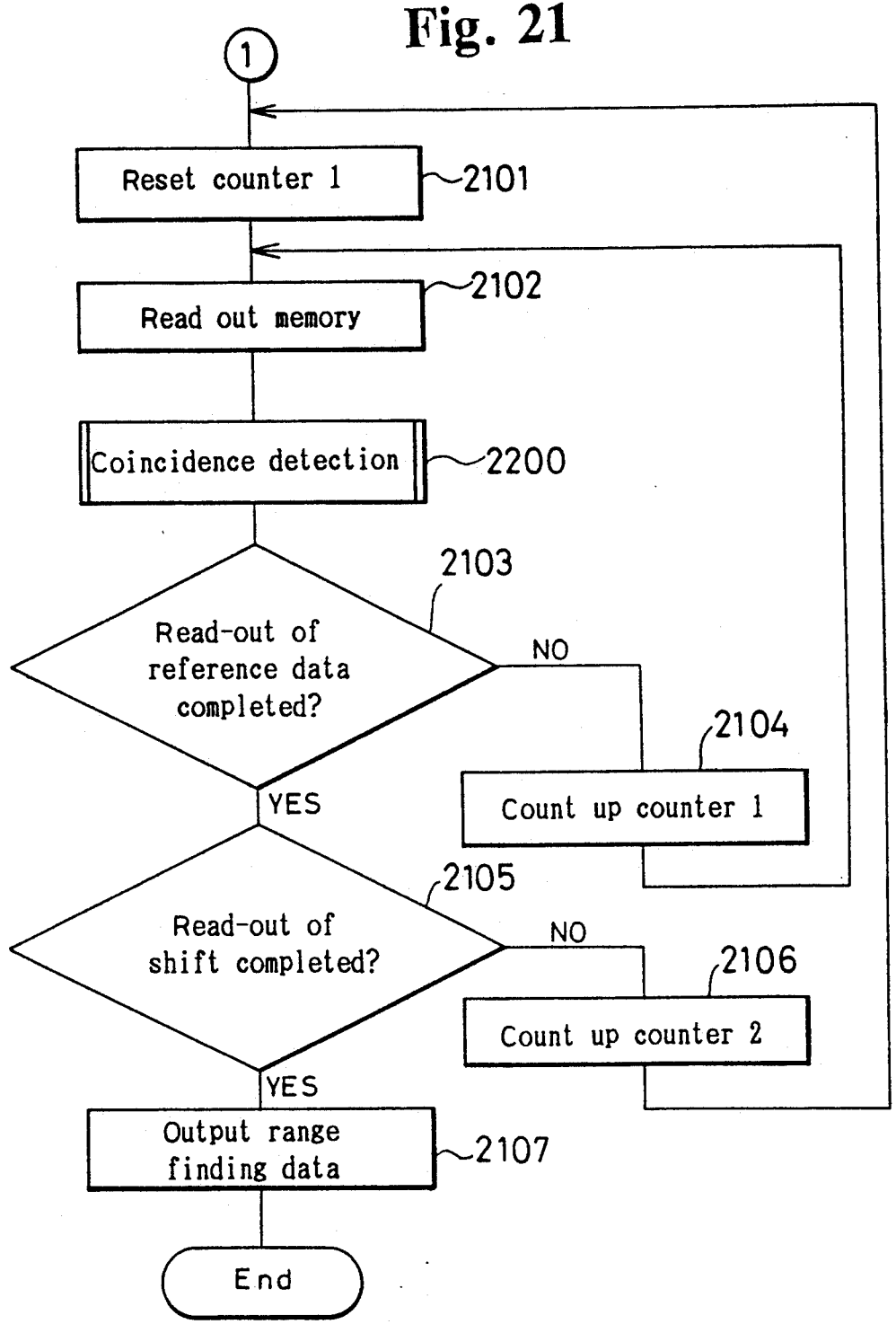
FIG. 21 is a flow chart of the program routine executed in Embodiments 3.1, 3.2, 4.1 and 4.2 to read out given data from the respective zero-cross memory circuits in order to detect a coincidence of the data stored in these zero-cross memory circuits.
Figure 22:
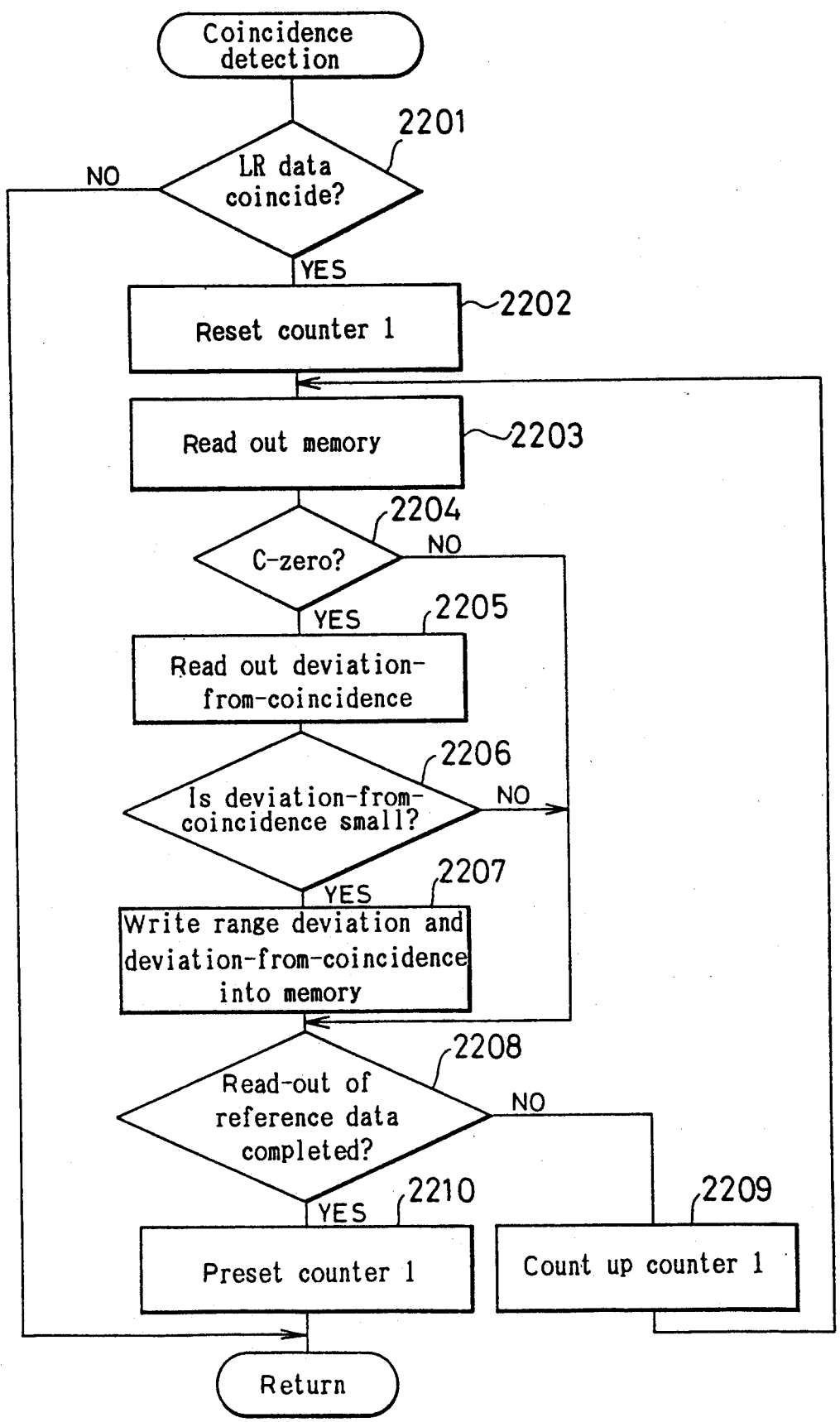
FIG. 22 is a flow chart of the program routine executed in Embodiments 3.1 and 3.2 to obtain the range finding data based on information indicating a coincidence or the minimum deviation-from-coincidence occurring in the data stored in the respective zero-cross memory circuits.

FIG. 22 illustrates a routine of coincidence detection. The routine starts with determination whether the zero-cross data R derived from the right side line sensor 20d coincides with the zero-cross data L derived from the left side line sensor 30b (step 2201). If not, the routine returns to the step 2103 (FIG. 21). If the coincidence is detected, the routine proceeds to a step 2202 to reset the first counter 50. Data is read out from the central zero-cross memory circuit 14 (step 2203) and it is determined whether this data is the C-zero data or not (step 2204). If not, the routine proceeds to a step 2208 to determine whether read-out of the memory data (reference data) corresponding to all the effective pixels in the central line sensor 10b has been completed or not.

If conclusion of the step 2204 is YES, the deviation-from-coincidence data is read out from the deviation-from-coincidence memory circuit 90 (step 2205) so as to be compared with deviation-from-coincidence in the C-zero data. If the deviation-from-coincidence in the C-zero data is larger than that read out from the memory circuit 90, the routine proceeds to a step 2208. If the deviation-from-coincidence in the C-zero data is smaller than that read out from the memory circuit 90, this smaller deviation-from-coincidence data is written into the deviation-from-coincidence memory circuit 90 in the place of the data previously stored therein, and the current value of the count signal (COUNTER 1) from the first counter 50 and the current value of the count signal (COUNTER 2) from the second counter 60 are written into the data memory circuit 80 as an address data and a range data, respectively. The routine proceeds to a step 2208 to determine whether read-out of the reference data has been completed or not. If not, the first counter 50 is counted up (step 2209) and then the routine returns to the step 2203 and the steps 2203 through 2208 are repeated. Consequently, the deviation-from-coincidence memory circuit 90 has the data previously stored therein replaced by the minimum deviation-from-coincidence and the result of range finding corresponding to the minimum deviation-from-coincidence is stored in the data memory circuit 80. An alternative routine may be provided so that, when the deviation-from-coincidence reaches "0" in the course of coincidence detection, the procedure is completed, a current value of range finding is stored and the routine returns to the step 2103.

If read-out of the reference data has been completed and conclusion of the step 2208 is YES, the first counter 50 is preset (step 2210) and the routine returns to the step 2103 to determine whether read-out of the memory data (reference data) corresponding to all the effective pixels of the central line sensor 10b has been completed or not based on the count value of the first counter 50 and, if not, the routine proceeds to a step 2104 to count up the first counter 50, then returns to the step 2102. Thus, the steps 2102 and 2103 for the coincidence detection are executed.

After read-out of the reference data has been completed, the routine proceeds from the step 2103 to a step 2105 to determine whether the data in the right and left side zero-cross memory circuits 24, 34 have been shifted with respect to the data in the central zero-cross memory circuit 14 by a specified amount and the above-mentioned steps 2101 through 2103 have been executed (shift read-out) or not, based on the count value of the second counter 60 (step 2105). If the shift read-out has not been completed, the second counter 60 is counted up and thereafter the routine returns to step 2101. After the shift read-out has been completed and the steps 2102 through 2103 are repeated. If the shift read-out has been completed, the routine proceeds to a step 2107.

Read-out of the memory data during these steps 2101 through 2106 is performed with the help of the address computing circuits 15, 25, 35 according to the equations (18), (19), (20) which correspond to the previously mentioned equations (9), (10), (11), respectively. A relationship between the write-in address and the read-out address will be described in reference with FIGS. 23 and 24.

Figure 23A:
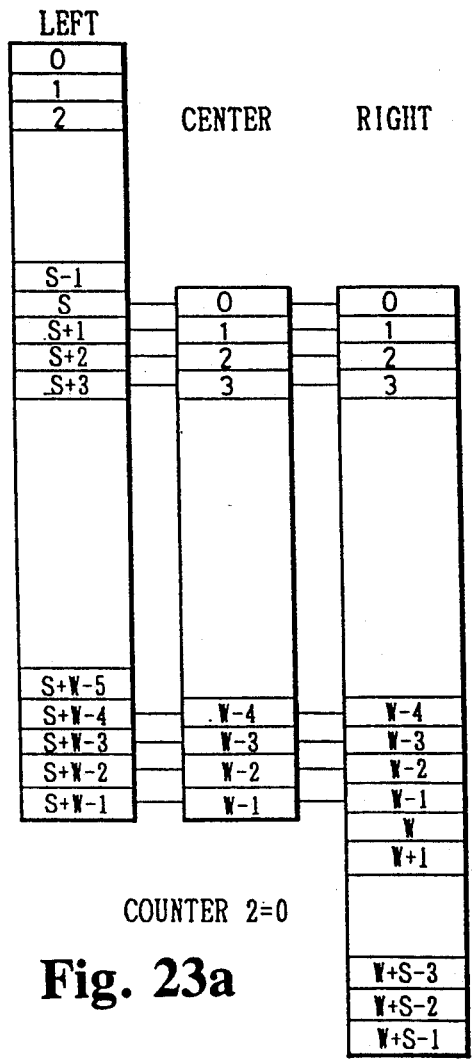
FIG. 23(a) and FIG. 23(b) is a diagram illustrating the procedure executed in Embodiments 3.1, 3.2, 4.1 and 4.2 to read and compare the data stored in the respective zero-cross memory circuits.
Figure 23B:
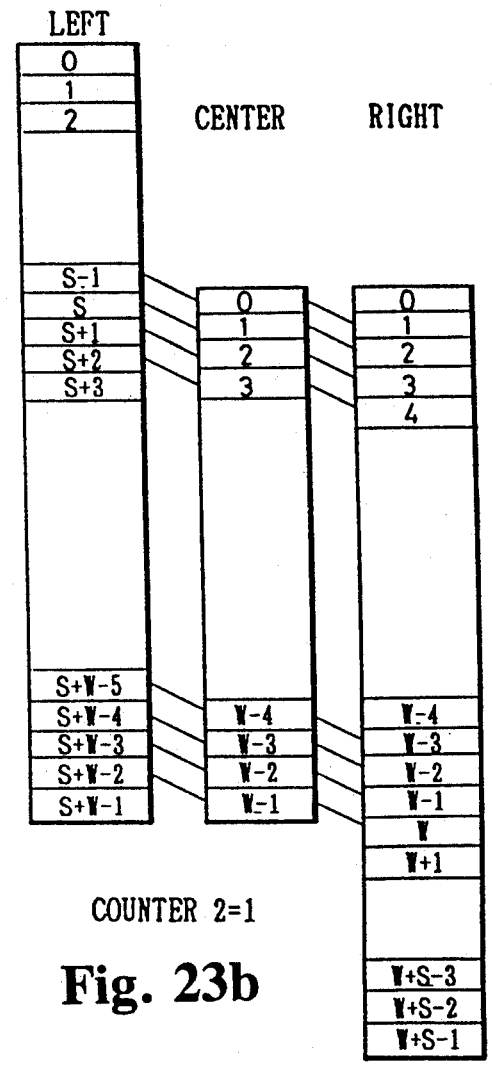

FIG. 23(a) illustrates the case in which the count signal from the second counter 60 is set to 0 (COUNTER 2=0). In such case, the data stored at the addresses corresponding to the respective pixels in the line sensors 10b, 20b, 30b are compared one to another with the first counter 50 being successively incremented from 0 to (W−1) (step 2104) and thereby a coincidence of these data is detected. Accordingly, if COUNTER 2=0, the address will be incremented from 0 to (W−1) for the central line sensor 10b, from 1 to W for the right side line sensor 20b and from (S−1) to (S+W−2) for the left side line sensor 30b. In other words, the memory data in the right side zero-cross memory circuit 24 and the left side zero-cross memory circuit 34 will be subjected to the coincidence detection with shift of one pixel with respect to the memory data in the central zero-cross memory circuit 14.

The coincidence detection will be repeated as the counter 60 is successively incremented (step 2106) until the count signal of the second counter 60 reaches COUNTER 2=S. FIG. 24(a) illustrates the case of COUNTER 2=S−1 and FIG. 24(b) illustrates the case of COUNTER 2=S.

More specifically, the count value of the second counter 60 at the moment when the memory data in the right and left side zero-cross memory circuits 24, 34 coincide with each other and a deviation-from-coincidence of the memory data in the central zero-cross memory circuit 14 reaches the minimum value corresponds to the amount of displacement Xp in the previously mentioned equation (6). At a step 2207, this amount Xp is stored in the data memory circuit 80 as the range data.

If the step 2105 determines that read-out of a given shift has been completed, the routine proceeds to a step 2107 at which the range data written into the data memory circuit 80 at the step 2207 is applied to an objective drive mechanism (not shown) so that the objective may be moved so as to focus the camera on the scene.

According to this Embodiment 3.1, when two of three zero-cross data coincide with each other but the remaining zero-cross data is out of coincidence, an effective range finding data can be obtained at the location of the minimum deviation-from-coincidence and, therefore, a range to the scene to be photographed can be reliably obtained even when not all of three zero-cross data are in coincidence due to an error involved in installation of the photosensors.

EMBODIMENT 3.2

FIG. 25 shown Embodiment 3.2 which is similar to the previous Embodiment 2.2 in employing a single line sensor.

Specifically, also in this Embodiment 3.2, photosensors 10, 20, 30 comprise a single line sensor which comprises, in turn, a photodetector array including an appropriate number of pixels arranged side by side, and three imaging lenses. As shown by FIG. 15, there are provided three imaging lenses 10a, 20a, 30a on the front side of camera so that light rays emitted from a scene to be photographed pass through these imaging lenses 10a, 20a, 30a and imaged on corresponding sections of the line sensor 8 place behind the respective imaging lenses. Output sides of the respective zero-cross memory circuits 14, 24, 34 are, as in the case of Embodiment 3.1, connected to a coincidence detecting circuit 370 of which the output side is connected to the control circuit 40, and a scanning count signal is applied to the first counter 50 via a preset data signal link 370a. The deviation-from-coincidence memory circuit 90 is connected to the coincidence detecting circuit 370 via deviation-from-coincidence information links 90a, 90b. A circuit block diagram relating to detection of deviation-from-coincidence is similar to FIG. 20 in reference with which Embodiment 3.1 has been described.

Routines to write and read the luminance information concerning the scene to be photographed are similar to the procedures illustrated by the flow charts of FIGS. 16 through 18 and FIGS. 21, 22, respectively.

According to this Embodiment 3.2, both the secondary difference computing circuit and the zero-cross detecting circuit may be single because there is provided a single line sensor divided into three sections so as to be separately utilized.

EMBODIMENT 4.1

Embodiment 4.1 is shown by FIGS. 26 through 28, in which FIG. 26 is a circuit block diagram corresponding to FIG. 19 showing Embodiment 3.1, and the parts similar to those in FIG. 19 are designated by same reference numerals as in FIG. 19.

In this Embodiment 4.1, output sides of the respective zero-cross memory circuits 14, 24, 34 are connected to a coincidence detecting circuit 470 and output side of this coincidence detecting circuit 470 is connected to the control circuit 40. The first counter 50 is applied with LR coinciding visual field location data via a first present data signal link 470a and also with scanning start location data via a second preset data signal link 470b. A deviation-from-coincidence memory circuit 490 is connected to the coincidence detecting circuit 470 via deviation-from-coincidence information links 490a, 490b. In coincidence detection of which the routine will be described later, a deviation-from-coincidence is stored in the deviation-from-coincidence memory circuit 490 when the zero-cross data for comparison stored in the right side zero-cross memory circuit 24 and the left side zero-cross memory circuit 34 are coincident with each other. The deviation-from-coincidence is defined by the absolute value of the difference between the location of the reference data stored in the central zero-cross memory circuit 14 when L and R zero-cross data coincide and the location occupied by these zero-cross data for comparison after they have been shifted. The count signal of the first counter 50 is applied to an address port 491 of the deviation-fromcoincidence memory circuit 490. In addition, the data memory signal is applied from the control circuit 40 to the deviation-from-coincidence memory circuit 490 and, based on this signal, the deviation-from-coincidence data is stored in the deviation-from-coincidence memory circuit 490.

Count signals from the first counter 50 are applied to the deviation-from-coincidence memory circuit 490 and also to the address port 81 of the data memory circuit 80 so that the deviation-from-coincidence correspond to the result of range finding stored in the data memory circuit 80 in one to one relationship. Count signals from the second counter 60 are applied to the range data port 82 of the data memory circuit 80. Both the count signals from the first counter 50 and the count signals from the second counter 60 are applied also to the control circuit 40 which supplies the data memory circuit 80 with a data memory signal. Based on this signal, an address data and a range data are stored in the data memory circuit 80.

FIG. 27 is a block diagram illustrating a procedure for detection of the deviation-from-coincidence. As illustrated, zero-cross data C, R, L of the scene luminance output from the central line sensor 10b, the right side line sensor 20b and the left side line sensor 30b based on the luminance distribution on the scene to be photographed and then stored in the respective zero-cross memory circuits 14, 24, 34 are applied together to a detection logic circuit 492. A coincidence signal generated when the zero-cross data L and R are coincident with each other is applied to a D flip-flop 493. The count value of the first counter 50 also is applied to this D flip-flop 493 and latched therein as a visual field location is shifted for relational computation of C, R and L. Signals from the first counter 50 are applied also to a computing circuit 494 and a comparator 495 as a value B. A specific value of the first counter signal which is latched at the moment when the signal indicating a coincidence of L and R is supplied from a detection logic circuit 492 is applied to computing circuits 494, 496, 497 as a value A and output from the computing circuit 497 is applied to the comparator 495 as a value D. The computing circuits 496, 497 are supplied also with a constant C concerning a scanning extent which is sufficient for detection of the deviation-from-coincidence.

The detection logic circuit 492 supplies also a zero-cross data (C-zero) relating to the data C derived from the central line sensor 10b. An absolute difference value (|A−B|) between the count value of the first counter 50 at the moment when the C-zero is output and the count value of the first counter applied from the D flip-flop 493 to the computing circuit 494 at the moment when L and R coincide with each other. This deviation-from-coincidence is applied to a comparator 498 so as to be compared with the deviation-from-coincidence previously stored in the deviation-from-coincidence memory circuit 90 and the smaller is registered into the deviation-from-coincidence memory circuit 490.

The computing circuit 496 computes a difference (A−C) between a value A of the first counter 50 at the moment LR coincidence is detected and the constant C and then provides this difference as a scanning start locating data (PRESET DATA 2). If (A−C)<0, the scanning start location data will be "0". The computing circuit 497 computes a sum D of the value A of the first counter 50 at the moment of LR coincidence and the constant C and applies this value D to the comparator. If (A+C)>(W−1), the value D will be "W−1" where W represents the final value of the scanning address. The comparator 495 compares the value D with the value B of the first counter 50 at the moment of the C-zero output and, if D=B, a scanning completion signal is output from the comparator 495.

Upon coincidence established between L and R, the value A is output from the D flip-flop 493 as a LR coincidence visual field location data (PRESET DATA 1).

Write-in and read-out of the luminance information are performed in accordance with the previously mentioned flow charts as illustrated by FIGS. 8, 21 and 28.

The steps 801 through 805 are run in the same manner as has already been described. Then, if read-out of the data corresponding to all the pixels has been completed and conclusion of the step 806 is YES, the routine proceeds to a step 2101 (FIG. 21) to reset the first counter 50. Next, data are read out from the respective zero-cross memory circuits 14, 24, 34 (step 2102) and the coincidence detecting circuit 70 determines whether the data from the central zero-cross memory circuit 14, right side zero-cross memory circuit 24 and the left side zero-cross memory circuit 34 coincide with one another or not (step 2200).

The coincidence detection is run according to the flow chart of FIG. 28. The routine starts with determination of a coincidence between the zero-cross data (L, R) derived from the left side line sensor 30b and the right side line sensor 20b, respectively (step 2801). If no coincidence is determined, the routine returns to the step 2103 (FIG. 21). If the coincidence is determined, the routine proceeds to a step 2802 to preset the first counter 50 to the value corresponding to the scanning start location data (PRESET DATA 2). Then, the data stored in the central zero-cross memory circuit 14 is read out (step 2803) and it is determined whether the data is the C-zero data or not (step 2804). Read-out of the C-zero data starts from the location given by (A−C) output from the computing circuit 496. If the step 2804 determines that the data stored in the central zero-cross memory circuit 14 is not the C-zero data, the routine proceeds to a step 2808.

If conclusion of the step 2804 is YES, a deviation-from-coincidence is read out from the deviation-from-coincidence memory circuit 90 (step 2805) and a deviation-from-coincidence in the C-zero data is compared to the deviation-from-coincidence read out from the circuit 90. If the deviation-from-coincidence in the C-zero data is larger than that read out from the circuit 90, the routine proceeds to a step 2808. If the deviation-from-coincidence in the C-zero data is smaller than that read out from the circuit 90, the deviation-from-coincidence previously stored in the deviation-from-coincidence memory circuit 90 is now replaced by the deviation-from-coincidence in the C-zero data, and a current value of the count signal (COUNTER 1) from the first counter 50 and a current value of the count signal (COUNTER 2) from the second counter 60 are written into the data memory circuit 80 as the address data and the range data, respectively. Now the routine proceeds to a step 2808 to determine whether scanning of the central visual field has been completed or not. Specifically, a sum D of the LR coincidence visual field location data and the constant C is computed by the computing circuit 497 and if the value D is equal to the count signal from the first counter 50, the scanning completion signal is output from the comparator 495.

Therefore, scanning for the purpose of C-zero data detection is performed over an extent which is twice the constant C and such extent corresponds to the extent of the central visual field. Accordingly, the step 2808 determines whether the scanning has been performed or not over the extent starting from the location A−C and terminating at the location A+C. If it is determined that scanning of the central visual field has not been completed, the first counter 50 is counted up (step 2809) and then the routine returns to the step 2803 to repeat the steps 2803 through 2808. Consequently, the minimum deviation-from-coincidence data is anew stored in the deviation-from-coincidence memory circuit 90. Alternatively, a sequence may be followed such that the coincidence detection is terminated when the deviation-from-coincidence reaches "0" in the course of coincidence detection, the range finding data obtained at this moment is stored in the data memory circuit 80, and thereafter the routine returns to the step 2103.

If scanning of the central visual field has been completed and conclusion of the step 2808 is YES, the first counter 50 is preset to the value of the LR coincidence visual field location data (PRESET DATA 1) (step 2810). Then the routine returns from the step 2810 to the step 2103 to determine whether read-out of the memory data (reference data) corresponding to all the effective pixels of the central line sensor 10b has been completed or not, based on the value of the first counter 50 and, if not, the routine proceeds to a step 2104 to count up the first counter 50, then returns to the step 2102. Thus, the steps to the step 2103 for the purpose of coincidence detection are executed.

After read-out of the reference data has been completed, the routine proceeds from the step 2103 to a step 2105 to determine whether the data stored in the right and left side zero-cross memory circuits 24, 34 have been shifted by a specified amount with respect to the data stored in the central zero-cross memory circuit 14 and the above-mentioned steps 2101 through 2103 (shift read-out) have been executed or not, based on the count value of the second counter 60 (step 2105). If the shift read-out has not been completed, the second counter 60 is counted up and thereafter the routine returns to the step 2101. Then, the steps 2102 through 2103 are repeated. After the shift read-out has been completed, the routine proceeds to a step 2107.

During these steps 2101 through 2106, read-out of the memory data is performed by the address computing circuits 15, 25, 35 at the addresses given according to the equations (18), (19), (20) corresponding to the equations (9), (10), (11), respectively. A relationship established here between write-in address and read-out address is similar to the relationship as has been explained in reference with FIGS. 23 and 24.

Specifically, the count value of the second counter 60 at the moment when the memory data of the right and left zero-cross memory circuits 24, 34 coincide with each other and a deviation-from-coincidence of the memory data of the central zero-cross memory circuit 14 with respect to the memory data of those zero-cross memory circuits 24, 34 takes the minimum value corresponds to the displacement Xp in the previously mentioned equation (6). At the step 2807, this amount of displacement is stored in the data memory circuit 80 as the range data.

According to this Embodiment 4.1, the range to a scene to be photographed can be reliably computed even when an error involved in mounting of the photosensors prevents all three sets of data from being brought into coincidence, because an effective range finding data can be obtained at the location corresponding to the minimum deviation-from-coincidence when two of all three zero-cross data sets coincide with each other but the remaining one zero-cross data set is not coincident with them. In addition, detection of the deviation-from-coincidence is achieved by scanning only a predetermined extent and thereby a time taken for detection of the deviation-from-coincidence is correspondingly reduced.

EMBODIMENT 4.2

FIG. 29 shows Embodiment 4.2 which employs, similarly to the precedent Embodiments 2.2 and 3.2, a single line sensor in the circuit arrangement.

According to this Embodiment 4.2, photosensors 10, 20, 30 comprise a single line sensor which comprises, in turn, a photodetector array including an appropriate number of pixels arranged side by side and three imaging lenses. As shown by FIG. 15, there are provided these three imaging lenses 10a, 20a, 30a on the front side of camera so that light rays emitted from a scene to be photographed pass through these imaging lenses 10a, 20a, 30a and are imaged on respective sections of the line sensor 8 placed behind the imaging lenses. Similarly to Embodiment 4.1, output sides of the respective zero-cross memory circuits 14, 24, 34 are connected to a coincidence detecting circuit 470 of which the output side is connected to the control circuit 40. Scanning count signals are applied to the first counter 50 via a present data signal link 470a. The coincidence detecting circuit 470 is connected also to a deviation-from-coincidence memory circuit 490 via deviation-from-coincidence information links 490a, 490b. A circuit block diagram relating to detection of deviation-from-coincidence is similar to FIG. 27 illustrating Embodiment 4.1.

Write-in and read-out of the luminance information are performed according to the flow charts of FIGS. 16 through 18, FIG. 21 and FIG. 28.

According to this Embodiment 4.2, similarly to Embodiments 2.2 and 3.2, both the secondary difference computing circuit and the zero-cross detecting circuit may be single because this Embodiment adopts a single line sensor so as to be divided into three sections.

EFFECT OF THE INVENTION

The range finder for passive type autofocussing device of the invention allows a computative processing required for range finding to be achieved more rapidly than the conventional range finder adapted to derive the range data from correlational computation, since the range finder of the invention is so arranged, as will be apparently understood from the foregoing detailed description, that a luminance on a scene to be photographed is picked up by three line sensors, secondary differences are computed from respective luminance data provided by the respective line sensors, zero-cross data characterized by zero-cross points of these secondary differences are stored in respective memory circuits, one of these three zero-cross data is selected as the reference zero-cross data, the other two zero-cross data are successively shifted by one pixel at a time, respectively, with respect to the reference zero-cross data until a coincidence of these three zero-cross data is detected, and an amount of such shifting which has been required to reach the coincidence is used as a range data to determine a range to the scene. In this manner, the range finder of this invention is particularly useful for reliably catching a dynamic scene to be photographed and rapidly focusing on it.

Additionally, the range finder of the invention allows the range data to be obtained at a high precision because the invention relies upon comparison of zero-cross data associated with the respective secondary differences instead of depending upon the luminance distribution pattern on each line sensor.

What is claimed is:

1. A range finder for a passive type autofocusing device, the range finder comprising:
    a first photosensor, a second photosensor, and a third photosensor, said photosensors adapted to pick up a luminance distribution on a scene to be photographed;
    secondary difference computing circuits coupled to said photosensors to compute secondary differences of output signals from the respective photosensors;
    zero-cross detecting circuits coupled to said secondary difference computing circuits to detect zero-cross points of output signals from the respective secondary difference computing circuits;
    zero-cross memory circuits coupled to delecting circuits for storing the zero-cross behavior signals obtained by the respective zero-cross detecting circuits; and
    a coincidence detecting circuit coupled to said memory circuits to compare the zero-cross behavior signals stored in the respective zero-cross memory circuits and thereby to detect a coincidence of these zero-cross behavior signals;
    wherein said first photosensor is selected as a reference photosensor and the zero-cross behavior signals obtained from said second and third photosensors are successively shifted relative to the zero-cross behavior signal obtained from the reference photosensor until a coincidence of these zero-cross behavior signals is detected by the coincidence detecting circuit;
    wherein a pixel location of at least one photosensor where zero-cross data exists is provided with a predetermined width tolerance on both sides of said pixel location so that coincidence can be effectively detected when the zero-cross data from at least one of the other two photosensors fall within said width tolerance of said pixel location; and
    wherein a range to the scene to be photographed is computed based on an amount of such shifting.

2. Range finder for passive type autofocusing device as recited in claims 2, wherein said photosensors comprise a single line sensor divided into three sections and three imaging lenses adapted to image the scene to be photographed the respective sections and wherein a single secondary difference computing circuit is coupled to said line sensor and a single zero-cross detecting circuit is coupled to said secondary difference computing, circuit.

3. A range finder for a passive type autofocusing device, the range finder comprising:
    three photosensors to pick up a luminance distribution on a scene to be photographed;
    secondary difference computing circuits coupled to said photosensors to compute secondary differences of output signals from the respective photosensors;
    zero-cross detecting circuits coupled to said difference computing circuits to detect zero-cross points of output signals from the respective secondary difference computing circuits;
    zero-cross memory circuits coupled to said difference computing circuits to store the zero-cross behavior signals obtained by the respective zero-cross detecting circuits; and
    a coincidence detecting circuit coupled to said zero-cross memory circuits to compare to compare the zero-cross behavior signals stored in the respective zero-cross memory circuits with one another and thereby to detect a coincidence of these zero-cross behavior signals; and
    a deviation-from-coincidence memory circuit coupled to the coincidence detecting circuit for detecting a coincidence of the zero-cross behavior signals, one of said three photosensors being a reference photosensor and the zero-cross behavior signals obtained from the other two photosensors being successively shifted with respect to the zero-cross behavior signal obtained from the reference photosensor until a coincidence of these zero-cross behavior signals is detected by the coincidence detecting circuit, and said deviation from coincidence memory adapted to store a deviation from coincidence when said zero-cross data from said other two photosensors are coincident with each other and the zero-cross data obtained from the reference photosensor contains the reference zero-cross data which coincides with the zero-cross data of said other two photosensors, said deviation-from-coincidence represented by an absolute value of the difference between the location of the zero-cross data of said other two photosensors after being shifted and the location of the reference zero-cross data, with the resultant range finding data obtained by the coincidence detecting circuit;
    wherein a range to the scene is computed based on the result of range finding obtained from the minimum deviation-from-coincidence between the mutually coincident zero-cross data of said other two photosensors and the reference zero-cross data.

4. A range finder for a passive type autofocusing device as recited in claim 3, wherein the zero-cross data contained in a width tolerance provided on both sides of the reference zero-cross data is scanned, when the minimum deviation-from-coincidence between the mutually coincident two zero-cross data and the reference zero-cross data is detected.

5. Range finder for passive type autofocusing device as recited in claims 4, wherein said photosensors comprise a single line sensor divided into three sections and three imaging lenses adapted to image the scene to be photographed on the respective sections and wherein a single secondary difference computing circuit is coupled to said line sensor and a single zero-cross detecting circuit is coupled to said secondary difference computing circuit.

6. Range finder for passive type autofocusing device as recited in claims 3, wherein said photosensors comprise a single line sensor divided into three sections and three imaging lenses adapted to image the scene to be photographed on the respective sections and wherein a single secondary difference computing circuit is coupled to said line sensor and a single zero-cross detecting circuit is coupled to said secondary difference computing circuit.

* * * * *

UNITED STATES PATENT AND TRADEMARK OFFICE
CERTIFICATE OF CORRECTION

PATENT NO. : 5,298,934  
DATED : March 29, 1994  
INVENTOR(S) : Minoru Ishiguro

Page 1 of 5

It is certified that error appears in the above-indentified patent and that said Letters Patent is hereby corrected as shown below:

Column 1, line 30:
   "device" should be --devices--.

Column 2, line 33:
   "$X_0$" should be --$x_0$--.

Figure 31A:
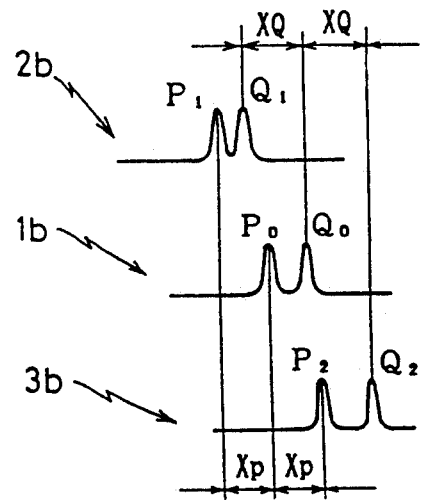
FIG. 31(a), FIG. 31(b), FIG. 31(c) is a signal diagram based on the luminance distribution of the scene detected by the photodetector arrays according to the principle of range finding.
Figure 31B:
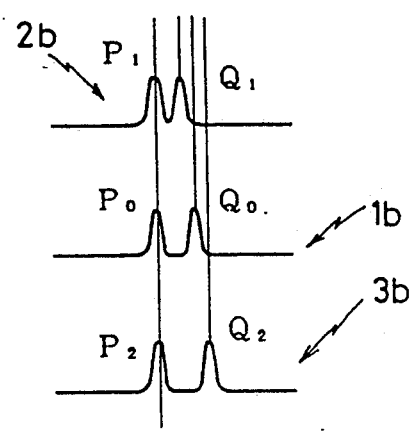
Figure 31C:
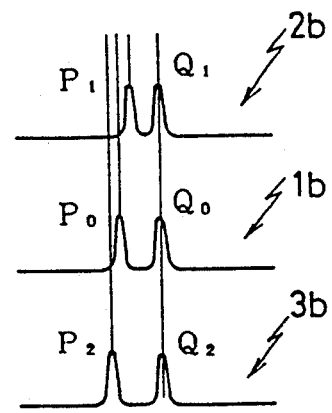
Figure 32:
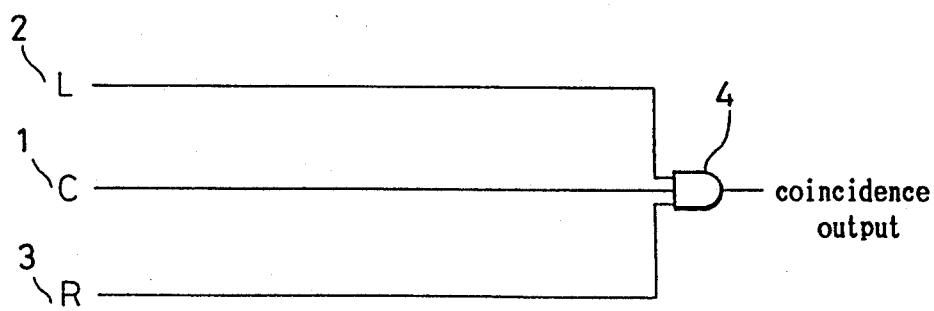
FIG. 32 is a circuit diagram illustrating a coincidence detecting circuit according to the prior art.

Column 2, line 43:
   After "by" insert --Fig. 31--.

Column 4, line 3:
   Delete "in which" and insert therefor --store--.

Column 4, line 5:
   Delete "are stored, and a" and insert therefor --. A--.

Column 4, line 6:
   Delete "to compare" and insert therefor --compares--.

Column 4, line 8:
   Delete "to detect" and insert therefor --detects--.

Column 4, line 9:
   Delete ", wherein one" and insert therefor --. One--.

Column 4, line 16:
   "circuit a" should be --circuit. A--.

Column 4, line 32:
   After "signals" delete --, in--.

Column 4, line 58:
   "circuits" should be --circuit--.

UNITED STATES PATENT AND TRADEMARK OFFICE
CERTIFICATE OF CORRECTION

PATENT NO. : 5,298,934
DATED : March 29, 1994
INVENTOR(S) : Minoru Ishiguro

It is certified that error appears in the above-indentified patent and that said Letters Patent is hereby corrected as shown below:

Column 4, line 59:
    Delete "in which" and insert therefor --store--.

Column 5, line 12:
    After "stored" insert --. The deviation from coincidence is--.

Column 5, line 12:
    After "absolute" insert --value--.

Column 5, line 14:
    Before "shifted" insert --being--.

Column 6, line 41:
    After "7(a)" delete --is a-- and after "7(c)" insert --is a waveform--.

Column 6, line 42:
    Before "luminance" delete --waveform--.

Column 6, line 49:
    Before "routine" insert --program--.

Column 8, line 12:
    After "drawings" delete --, in which--.

Column 8, line 65:
    After "utilize" insert --sample hold--.

Column 9, line 10:
    After "FIG. 7(b)" insert --is a waveform showing--.

UNITED STATES PATENT AND TRADEMARK OFFICE
CERTIFICATE OF CORRECTION

PATENT NO. : 5,298,934
DATED : March 29, 1994
INVENTOR(S) : Minoru Ishiguro

It is certified that error appears in the above-indentified patent and that said Letters Patent is hereby corrected as shown below:

Column 9, line 11:
    "shows" should be --showing--.

Column 11, line 52:
    After "10" insert --(a)-10(c)--.

Column 11, line 54:
    "FIG." should be --FIGS.--.

Column 13, line 36:
    Delete "circuit" and insert therefor --gate--.

Column 13, line 37:
    Delete "circuit" and insert therefor --gate--.

Column 13, line 39:
    Delete "circuit" and insert therefor --gate--

Column 13, line 40:
    "gate" should be --gates--.

Column 13, line 41:
    "output the" should be --the output--.

Column 13, lines 61 and 62:
    "output the" should be --the output--.

Column 14, line 28:
    "If" should be --It--.

Column 14, line 66:
    "FIGS. 12 or 13" should be --FIG. 12 or FIG. 13--.

UNITED STATES PATENT AND TRADEMARK OFFICE
CERTIFICATE OF CORRECTION

PATENT NO. : 5,298,934
DATED : March 29, 1994
INVENTOR(S) : Minoru Ishiguro

It is certified that error appears in the above-indentified patent and that said Letters Patent is hereby corrected as shown below:

Column 15, line 28:
  "lines" should be --line--.

Column 19, line 52:
  After "absolute" insert --value-- and after "difference" delete --value--.

Column 20, line 3:
  "area" should be --are--.

Column 20, line 7:
  After "zero-cross" delete --cross--.

Column 22, line 50:
  "present" should be --preset--.

Column 26, line 32:
  "present" should be --preset--.

Column 27, line 25, claim 1:
  "delecting" should be --detecting--.

Column 28, line 10:
  Delete "to compare" (second occurrence).

Column 27, line 53, claim 2:
  "claims 2" should be --claim 1--.

Column 28, line 51, claim 5:
  "claims" should be --claim--.

UNITED STATES PATENT AND TRADEMARK OFFICE
CERTIFICATE OF CORRECTION

PATENT NO. : 5,298,934
DATED : March 29, 1994
INVENTOR(S) : Minoru Ishiguro

It is certified that error appears in the above-indentified patent and that said Letters Patent is hereby corrected as shown below:

Column 28, line 60, claim 6:
    "claims" should be --claim--.

Signed and Sealed this

Sixth Day of December, 1994

*Attest:*

BRUCE LEHMAN

*Attesting Officer*      *Commissioner of Patents and Trademarks*